United States Patent
Sun et al.

(10) Patent No.: US 11,575,748 B2
(45) Date of Patent: *Feb. 7, 2023

(54) DATA STORAGE METHOD AND APPARATUS FOR COMBINING DIFFERENT DATA DISTRIBUTION POLICIES

(71) Applicant: Huawei Technologies Co., Ltd., Shenzhen (CN)

(72) Inventors: Guilin Sun, Beijing (CN); Huaizhong Liu, Beijing (CN); Li Zha, Beijing (CN); Xianyin Xin, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 34 days.

This patent is subject to a terminal disclaimer.

(21) Appl. No.: 17/198,908

(22) Filed: Mar. 11, 2021

(65) Prior Publication Data
US 2021/0203723 A1  Jul. 1, 2021

Related U.S. Application Data

(63) Continuation of application No. 16/586,074, filed on Sep. 27, 2019, now Pat. No. 10,972,542, which is a continuation of application No. PCT/CN2018/073315, filed on Jan. 19, 2018.

(30) Foreign Application Priority Data

Mar. 29, 2017  (CN) .......................... 201710198809.3

(51) Int. Cl.
*H04L 67/1097* (2022.01)

(52) U.S. Cl.
CPC .............................. *H04L 67/1097* (2013.01)

(58) Field of Classification Search
CPC ....... H04L 29/08; H04L 67/1097; G06F 3/06; G06F 3/067; G06F 3/0614; G06F 3/065; G06F 9/50

See application file for complete search history.

(56) References Cited

U.S. PATENT DOCUMENTS

| 9,032,147 | B1 | 5/2015 | Bitner et al. |
| 2008/0091899 | A1 | 4/2008 | Innan et al. |
| 2010/0274762 | A1 | 10/2010 | Murphy et al. |

(Continued)

FOREIGN PATENT DOCUMENTS

| CN | 1495619 A | 5/2004 |
| CN | 1694415 A | 11/2005 |

(Continued)

*Primary Examiner* — Frantz B Jean
(74) *Attorney, Agent, or Firm* — Conley Rose, P.C.

(57) ABSTRACT

A method and apparatus with a data storage device receives a data write request that is sent by a first tenant, and determines, from a plurality of resource zones (RZs) and based on the data write request and storage permission of the first tenant for each of the plurality of RZs. The data storage device further determines distribution of N duplicates in the at least one RZ based on the data write request and a first data distribution policy, and stores the N duplicates into at least one node corresponding to the at least one RZ based on distribution of the N duplicates in the at least one RZ and a second data distribution policy.

20 Claims, 6 Drawing Sheets

100

(56) References Cited

U.S. PATENT DOCUMENTS

| | | | |
|---|---|---|---|
| 2011/0093436 A1* | 4/2011 | Zha | G06F 16/178 |
| | | | 711/E12.001 |
| 2012/0272025 A1 | 10/2012 | Park et al. | |
| 2013/0166207 A1 | 6/2013 | Shao et al. | |
| 2014/0164391 A1 | 6/2014 | Chai et al. | |
| 2014/0280595 A1* | 9/2014 | Mani | H04L 67/10 |
| | | | 709/204 |
| 2014/0280956 A1 | 9/2014 | Shu et al. | |
| 2015/0139238 A1* | 5/2015 | Pourzandi | H04L 45/42 |
| | | | 370/392 |
| 2015/0178135 A1* | 6/2015 | Wang | H04L 45/742 |
| | | | 718/104 |
| 2015/0278243 A1 | 10/2015 | Vencent et al. | |
| 2016/0042194 A1 | 2/2016 | Chakraborty et al. | |
| 2019/0129649 A1 | 5/2019 | Zhong | |
| 2019/0220211 A1* | 7/2019 | Wang | G06F 3/067 |

FOREIGN PATENT DOCUMENTS

| | | |
|---|---|---|
| CN | 101499061 A | 8/2009 |
| CN | 102096602 A | 6/2011 |
| CN | 102110060 A | 6/2011 |
| CN | 102663096 A | 9/2012 |
| CN | 102664923 A | 9/2012 |
| CN | 102946429 A | 2/2013 |
| CN | 103384550 A | 11/2013 |
| CN | 103873507 A | 6/2014 |
| CN | 104881749 A | 9/2015 |
| CN | 105373340 A | 3/2016 |
| CN | 103384550 B | 5/2016 |
| CN | 105630418 A | 6/2016 |
| CN | 106095586 A | 11/2016 |
| CN | 106201338 A | 12/2016 |
| WO | 2015070239 A2 | 5/2015 |

* cited by examiner

DATA STORAGE METHOD AND APPARATUS FOR COMBINING DIFFERENT DATA DISTRIBUTION POLICIES

CROSS-REFERENCE TO RELATED APPLICATIONS

This application is a continuation application of U.S. patent application Ser. No. 16/586,074, filed on Sep. 27, 2019 and which issued as U.S. Pat. No. 10,972,542, which is a continuation of International Patent Application No. PCT/CN2018/073315, filed on Jan. 19, 2018, which claims priority to Chinese Patent Application No. 201710198809.3, filed on Mar. 29, 2017. All of the aforementioned patent applications are hereby incorporated by reference in their entireties.

TECHNICAL FIELD

This application relates to the field of big data, and to a data storage method and apparatus.

BACKGROUND

A multi-tenant technology, also referred to as a multi-leasing service technology, is a software architecture technology that allows sharing of a same system or program component in a multiuser environment and that can ensure data isolation between users. In the current age of cloud computing, the multi-tenant technology provides, at a common data center using a single system architecture and service, a same and even customizable service for a majority of clients, and can ensure data isolation between tenants. Currently, various cloud computing services, for example, an Alibaba Cloud database service and an Alibaba Cloud server, belong to such a technology scope.

In a multi-tenant scenario, one tenant may be corresponding to at least one node, and a big data system performs unified management on the node and a relationship between the tenant and the node. The at least one node is a resource owned by the tenant. The tenant may use the at least one node to satisfy requirements such as data storage and computing-job running. In other approaches, when a tenant needs to store data, a resource control node directly determines, according to a preconfigured data distribution policy, distribution of data of the tenant at nodes. For example, the tenant requests to store 10 data duplicates, and nodes available to the tenant are a node A, a node B, and a node C. There may be a plurality of possible data distribution results determined by the resource control node for the tenant. Five duplicates may be distributed at the node A, three duplicates distributed at a node B, and two duplicates distributed at a node C; or seven duplicates may be distributed at a node B and three duplicates distributed at a node C. The tenant possibly has different requirements, or the tenant is in different application scenarios and requires different data distribution results. Therefore, in other approaches, a data distribution policy needs to be preconfigured for a data distribution result corresponding to each application scenario. Complexity is relatively high.

SUMMARY

In view of this, embodiments of this application provide a data storage method and apparatus, to flexibly control distribution of to-be-stored data of a tenant at a node using a combination of different data distribution policies, thereby reducing policy deployment complexity.

According to a first aspect, a data storage method is provided, including receiving a data write request that is sent by a first tenant using a client, where the data write request is used to indicate that the first tenant requests to store N duplicates of to-be-written data, and N is an integer greater than or equal to 1; determining, from a plurality of resource zones (RZs) and based on the data write request and storage permission of the first tenant for each of the plurality of RZ, at least one RZ available to the first tenant; determining, based on the data write request and a first data distribution policy, distribution of the N duplicates in the at least one RZ, where the first data distribution policy is used to indicate a distribution priority of the N duplicates in the at least one RZ; and storing, based on distribution of the N duplicates in the at least one RZ and a second data distribution policy, the N duplicates into at least one node corresponding to the at least one RZ, where the second data distribution policy is used to indicate a distribution priority of the N duplicates at a plurality of nodes corresponding to each of the at least one RZ.

In an embodiment, when the first tenant needs to store data, the first tenant may send the data write request to a main resource-control node using the corresponding client, where the data write request is used to indicate that the first tenant requests to store the N duplicates of the to-be-written data. The data write request may carry the N duplicates of the to-be-written data, or may carry one duplicate of the to-be-written data and a quantity N of the duplicates that the first tenant requests to store. This is not limited in this embodiment of this application. The main resource-control node receives the data write request, and determines, from the plurality of RZs and based on the data write request and the storage permission of the first tenant for each of the plurality of RZs, the at least one RZ available to the first tenant. Then, the main resource-control node stores, based on the data write request, the first data distribution policy, and the second data distribution policy, the N duplicates into the at least one node corresponding to the at least one RZ.

The first data distribution policy is used to indicate the distribution priority of the N duplicates in the at least one RZ, and the second data distribution policy is used to indicate the distribution priority of the N duplicates at the plurality of nodes corresponding to each of the at least one RZ. Therefore, data placement decision of the main resource-control node is implemented in the following two phases.

(1) Distribution of the N duplicates in the at least one RZ is determined based on the data write request and the first data distribution policy.

It should be understood that distribution herein refers to a correspondence between the N duplicates and the at least one RZ. For example, N=5, and the at least one RZ available to the first tenant is an RZ1 and an RZ2. In this case, according to the first data distribution policy, the five duplicates may be distributed in the two RZs as follows. Two duplicates are distributed in the RZ1, and three duplicates are distributed in the RZ2.

(2) Distribution of the N duplicates at the at least one node corresponding to the at least one RZ is determined based on distribution of the N duplicates in the at least one RZ and the second data distribution policy.

It should be understood that the storage permission of the first tenant for each of the plurality of resource zones RZs is determined based on a resource sharing policy of each RZ. Taking an RZ1 for example, a resource sharing policy of the RZ1 is used to indicate which tenants the RZ1 can provide a resource for. A tenant that does not meet the resource sharing policy of the RZ1 has no storage permission for the RZ1.

It should be further understood that the resource sharing policy and the data distribution policy coordinate with each other and restrict each other. The at least one RZ available to the first tenant has different resource sharing policies. Therefore, data may be stored based on different tenant requirements and using different data distribution policies in order to achieve different effects.

In this embodiment of this application, in the foregoing two phases, different polices may be independently applied based on different tenant requirements or different application scenarios faced by the tenant, and are combined to produce an expected data distribution result, with no need to preconfigure a data distribution policy for a data distribution result corresponding to each application scenario. First, nodes available to the tenant are grouped into the at least one resource zone RZ, the first data distribution policy is configured for the at least one RZ, and the second data distribution policy is configured for the nodes corresponding to the at least one RZ. During data storage, the main resource-control node may perform two-phase decision. In the first phase, data duplicate distribution in the at least one RZ is determined according to the first data distribution policy. In the second phase, data duplicate distribution at a specific node is determined based on the first phase and with reference to the second data distribution policy.

According to the data storage method in this embodiment of this application, the nodes available to the tenant are grouped into the at least one resource zone RZ, the first data distribution policy is configured for the at least one RZ, and the second data distribution policy is configured for the nodes corresponding to the at least one RZ. During data storage, the main resource-control node may perform two-phase decision according to the first data distribution policy and the second data distribution policy. Policies in the two phases may be independently configured such that the main resource-control node can combine data distribution policies in the different phases, and flexibly control, based on different tenant requirements and a scenario faced by the tenant, distribution of to-be-stored data of the tenant at the node, thereby reducing policy deployment complexity.

In a first possible implementation of the first aspect, the at least one RZ includes a first RZ and a second RZ, the first RZ is a reserved resource zone (RRZ) that only the first tenant is allowed to use, and the second RZ is a shared resource zone (SRZ) that a plurality of tenants including the first tenant are allowed to use.

In an embodiment, the at least one RZ available to the first tenant may include the first RZ that only the first tenant is allowed to use and the second RZ that the plurality of tenants including the first tenant are allowed to use. In this case, based on the foregoing data distribution policies, the N duplicates may be placed at nodes corresponding to the first RZ and the second RZ, respectively. For example, N=3, in other words, the quantity of duplicates of the to-be-written data is 3. In this case, in the first phase, the main resource-control node determines to place two of the duplicates in the RZ2, and place one remaining duplicate in the RZ1; in the second phase, the main resource-control node may preferentially select, from the RZ2, two nodes whose remaining space is large, to place the two duplicates, and preferentially select, from the RZ1, one node whose remaining space is large, to place the one duplicate.

It should be understood that the first data distribution policy may be that the data is preferentially stored in the first RZ, or may be that some of the duplicates are always stored in the second RZ. This is not limited in this embodiment of this application. The second data distribution policy may be an equiprobability distribution policy, may be a different-probability distribution policy considering remaining node space, or may be another policy customized based on a specific scenario. This is not limited in this embodiment of this application, either. Therefore, various expected effects can be achieved under different combinations of the first data distribution policy and the second data distribution policy.

With reference to the foregoing possible implementation of the first aspect, in a second possible implementation of the first aspect, the first data distribution policy is that the N duplicates are preferentially stored into the first RZ, and the determining, based on the data write request and a first data distribution policy, distribution of the N duplicates in the at least one RZ includes determining, based on the data write request, the first data distribution policy, and a space occupation status of the first RZ, that the first RZ is capable of storing P duplicates of the to-be-written data, where P is an integer greater than or equal to 1, and the space occupation status is used to indicate a size of occupied space of the first RZ or a size of remaining space of the first RZ; and when N is less than or equal to P, determining that the N duplicates are distributed in the first RZ; or when N is greater than P, determining that the P duplicates in the N duplicates are distributed in the first RZ, and a duplicate, other than the P duplicates, in the N duplicates is distributed in the second RZ.

In this embodiment of this application, the data of the tenant may be stored in the RRZ (that is, the first RZ) of the tenant as far as possible, to reduce usage of the SRZ (that is, the second RZ) as far as possible. From a perspective of costs of the tenant, the RRZ usually belongs to a prepaid resource of the tenant, and the SRZ belongs to a postpaid resource that is paid for based on a quantity. Less SRZ usage indicates fewer generated additional costs. From a perspective of platform operation, RRZ space is usually reserved for and exclusive to the tenant, and higher RRZ usage indicates higher platform resource usage.

It should be understood that the space occupation status may be space usage, remaining space, or the like of the RZ. This is not limited in this embodiment of this application. Optionally, in such a policy, a system may set a space usage threshold or a remaining space threshold for the RRZ. The first tenant can use a storage resource of the SRZ only when the space usage of the RRZ reaches the threshold. Therefore, the main resource-control node may determine, based on the data write request, the first data distribution policy, and the space occupation status and a space usage threshold of the first RZ, a quantity of duplicates of the to-be-written data that can be stored in the first RZ. This is not limited in this embodiment of this application.

With reference to the foregoing possible implementation of the first aspect, in a third possible implementation of the first aspect, the first data distribution policy is that Q duplicates in the N duplicates are stored into the second RZ, where Q is an integer greater than or equal to 1, and Q is less than or equal to N, and the determining, based on the data write request and a first data distribution policy, distribution of the N duplicates in the at least one RZ includes determining, based on the data write request and the first data distribution policy, that the Q duplicates in the N duplicates are distributed in the second RZ, and remaining (N-Q)

duplicates, other than the Q duplicates, in the N duplicates are distributed in the first RZ.

In this embodiment of this application, the tenant is allowed to specify storage quantities of data duplicates in different RZs. This policy is applicable to different scenarios. Examples are as follows. (1) For a purpose of maximum data access superposition bandwidth, data is usually accessed by a computing process or client that runs on the SRZ (that is, the second RZ). However, if most data duplicates are concentrated in the RRZ (that is, the first RZ), data access bandwidth is limited by a quantity of nodes of the RRZ, and as a result, a computing concurrency capability is limited. In this case, a better choice is to always store a specific quantity of data duplicates in the SRZ regardless of remaining space of the RRZ. (2) Tenants share data with each other, that is, the data is shared with another tenant after the data is generated. If data duplicates are concentrated in the RRZ, the other tenant also occupies an input/output I/O resource of the RRZ when accessing the data, and as a result, interference is caused to performance of an application of the tenant in the RRZ. In this case, interference to RRZ performance can be avoided by placing some of the data duplicates in the SRZ.

With reference to the foregoing possible implementation of the first aspect, in a fourth possible implementation of the first aspect, the determining, based on the data write request and the first data distribution policy, that remaining (N-Q) duplicates, other than the Q duplicates, in the N duplicates are distributed in the first RZ includes determining, based on the data write request, the first data distribution policy, and a space occupation status of the first RZ, that the first RZ is capable of storing P duplicates of the to-be-written data, where P is an integer greater than or equal to 1, and the space occupation status is used to indicate a size of occupied space of the first RZ or a size of remaining space of the first RZ; and when N-Q is less than or equal to P, determining that the (N-Q) duplicates are distributed in the first RZ; or when N-Q is greater than P, determining that the P duplicates in the (N-Q) duplicates are distributed in the first RZ, and a duplicate, other than the P duplicates, in the (N-Q) duplicates is distributed in the second RZ.

In an embodiment, when the first data distribution policy is that the Q duplicates in the N duplicates are stored into the second RZ, the remaining (N-Q) duplicates need to be placed in the first RZ according to the first data distribution policy. However, memory of the first RZ is limited and is possibly insufficient to store the (N-Q) duplicates. Therefore, the main resource-control node needs to determine distribution of the remaining (N-Q) duplicates based on the space occupation status of the first RZ. The main resource-control node may first determine, based on the data write request, the first data distribution policy, and the space occupation status of the first RZ, that the first RZ is capable of storing the P duplicates of the to-be-written data. If N-Q is less than or equal to P, the main resource-control node may determine to store all of the (N-Q) duplicates into the first RZ. If N-Q is greater than P, the main resource-control node may store the P duplicates of the to-be-written data into the first RZ, and store remaining (N-Q-P) duplicates into the second RZ.

With reference to any one of the foregoing possible implementations of the first aspect, in a fifth possible implementation of the first aspect, the method further includes storing, based on the space occupation status of the first RZ, all or some of duplicates in the second RZ into the first RZ, where the space occupation status is used to indicate the size of the occupied space of the first RZ or the size of the remaining space of the first RZ; and deleting the all or some of duplicates from the second RZ.

It should be understood that duplicate sizes are different for different data. The main resource-control node needs to determine, based on the space occupation status of the first RZ, a data volume that can be migrated from the second RZ to the first RZ. Optionally, a space usage threshold may be set. When space usage of the first RZ is less than the space usage threshold, the main resource-control node may migrate a duplicate from the second RZ to the first RZ.

In this way, RRZ usage can be improved. Because the RRZ is reserved for and exclusive to the tenant, generally, higher RRZ usage indicates higher resource usage of the big data system.

With reference to any one of the foregoing possible implementations of the first aspect, in a sixth possible implementation of the first aspect, before the receiving a data write request that is sent by a first tenant using a client, the method further includes receiving a resource zone creation request, where the resource zone creation request is used to request to create, for the first tenant, a third RZ in the at least one RZ; creating the third RZ based on the resource zone creation request, and determining a plurality of first nodes corresponding to the third RZ; adding first label information for each of the plurality of first nodes, where the first label information is used to identify the third RZ; and adding a first resource sharing policy for the third RZ, where the first resource sharing policy is used to indicate that the third RZ can be accessed by at least one tenant including the first tenant.

It should be understood that the label information is stored in a database of operation and maintenance management OMM software. To avoid dependence of a storage system on OMM during use, the label information is usually synchronized from an OMM system to the storage system (for example, a Hadoop distributed file system (HDFS)). Therefore, a different storage zone is formed for the label information in the storage system and corresponds to the RZ. Based on the label information, the main resource-control node may determine a specific duplicate placement node according to the data distribution policies.

With reference to any one of the foregoing possible implementations of the first aspect, in a seventh possible implementation of the first aspect, the method further includes receiving a resource zone deletion request, where the resource zone deletion request is used to request to delete a fourth RZ in the at least one RZ; deleting, based on the resource zone deletion request, duplicates stored at a plurality of second nodes corresponding to the fourth RZ; deleting second label information of each of the plurality of second nodes, where the second label information is used to identify the fourth RZ; and deleting a second resource sharing policy of the fourth RZ, where the second resource sharing policy is used to indicate that the fourth RZ can be accessed by at least one tenant including the first tenant.

In an embodiment, the main resource-control node may receive the resource zone deletion request, and determine to delete the fourth RZ in the at least one RZ. The main resource-control node may delete the data duplicates stored at the plurality of second nodes corresponding to the fourth RZ, and then delete the second label information of each of the plurality of second nodes and the second resource sharing policy of the fourth RZ.

With reference to the foregoing possible implementations of the first aspect, in an eighth possible implementation of the first aspect, the method further includes receiving a resource zone expansion request, where the resource zone expansion request is used to request to expand a fifth RZ in the at least one RZ; determining at least one third node based on the resource zone expansion request; and adding third label information for each of the at least one third node, where the third label information is used to identify the fifth RZ.

With reference to the foregoing possible implementations of the first aspect, in a ninth possible implementation of the first aspect, the method further includes receiving a resource zone shrinking request, where the resource zone shrinking request is used to request to shrink a sixth RZ in the at least one RZ; determining, based on the resource zone shrinking request, at least one fourth node corresponding to the sixth RZ; and deleting fourth label information of each of the at least one fourth node, where the fourth label information is used to identify the sixth RZ.

It should be understood that the foregoing resource zone management operations such as creation, deletion, expansion, and shrinking may be completed by the OMM system. Usually, a platform administrator performs an OMM operation. A cloud scenario is relatively special. In the cloud scenario, the tenant (possibly an administrator of the tenant) completes RZ management and maintenance in a self-service manner using the OMM system. This is not limited in this embodiment of this application.

According to a second aspect, a task allocation method is provided, including receiving a computing task allocation request sent by a first node, where the computing task allocation request is used to request to allocate a computing task to the first node, allocating, from a computing task of at least one tenant, a first computing task to the first node based on the computing task allocation request, a sharing policy of the first node, and a borrowing policy of the at least one tenant, where the sharing policy is used to indicate that the first node provides a computing resource for a computing task of i tenants in the at least one tenant, the borrowing policy is used to indicate that a first tenant in the at least one tenant is allowed to use a computing resource of j nodes, and both i and j are integers greater than 0, and sending task indication information to the first node, where the task indication information is used to indicate the first computing task.

It should be understood that the sharing policy is used to indicate which tenants the first node can provide a computing resource for, and the borrowing policy is used to indicate which nodes have resources that the tenant wants to use when node resources of the tenant are insufficient. These policies are usually configured in advance and stored in a database of big data system operation and maintenance management OMM software, and are usually configured by a system administrator and/or the tenant using the OMM software.

In addition, in final determining of the first computing task, the first computing task may be randomly selected from remaining computing tasks. Alternatively, a computing task with a highest priority may be selected as the first computing task based on a priority sequence of remaining computing tasks. This is not limited in this embodiment of this application.

In this embodiment of this application, the node is a resource provider, and the tenant is a resource user. The sharing policy of the node is merely used to indicate how the resource provider shares a resource of the resource provider, and does not concern a specific resource user. The borrowing policy of the tenant is merely used to indicate how the resource user borrows an available shared resource, and does not concern a specific resource provider. This can decouple a resource sharing mechanism from a resource borrowing mechanism.

Therefore, according to the task allocation method in this embodiment of this application, a main resource-control node flexibly performs, based on the computing-resource sharing policy of the computing node in a big data system and the computing-resource borrowing policy of the tenant, matching between the computing node and the computing task that is submitted by the tenant in order to allocate, to the computing node, a computing task that meets the policies. In this way, the resource sharing mechanism is decoupled from the resource borrowing mechanism. This is simple and easy to implement, and improves user experience.

In a first possible implementation of the second aspect, the allocating, from a computing task of at least one tenant, a first computing task to the first node based on the computing task allocation request, a sharing policy of the first node, and a borrowing policy of the at least one tenant includes performing, based on the computing task allocation request, matching between the computing task of the at least one tenant, and the sharing policy and the borrowing policy, filtering out, from the computing task of the at least one tenant, a computing task of m tenants that does not meet the sharing policy and the borrowing policy, where m is an integer greater than or equal to 1, and determining the first computing task from a remaining computing task other than the computing task of the m tenants.

In an embodiment, the main resource-control node may perform matching between at least one computing task in the system and the first node based on the sharing policy and the borrowing policy, and filter out the computing task that does not meet the sharing policy and the borrowing policy, to determine the first computing task to be allocated to the first node.

With reference to the foregoing possible implementation of the second aspect, in a second possible implementation of the second aspect, the computing task allocation request includes identifier information of the first node, and the filtering out, from the computing task of the at least one tenant, a computing task of m tenants that does not meet the sharing policy and the borrowing policy includes filtering out a computing task of p first tenants based on the identifier information of the first node and the sharing policy, where the p first tenants do not belong to the i tenants, and p is an integer greater than or equal to 0; and filtering out, from a computing task of a remaining tenant other than the computing task of the p first tenants, a computing task of (m-p) second tenants based on the identifier information of the first node and the borrowing policy, where the first node does not belong to the j nodes.

With reference to the foregoing possible implementation of the second aspect, in a third possible implementation of the second aspect, the filtering out, from the computing task of the at least one tenant, a computing task of m tenants that does not meet the sharing policy and the borrowing policy includes filtering out a computing task of (m-p) second tenants based on the identifier information of the first node and the borrowing policy, where a borrowing policy of the (m-p) second tenants indicates that using a computing resource of the first node is not allowed, and p is an integer greater than or equal to 0, and filtering out, from a computing task of a remaining tenant other than the computing task of the (m-p) second tenants, a computing task of p first tenants based on the identifier information of the first node and the sharing policy, where the p first tenants do not belong to the i tenants.

Optionally, the at least one tenant is M tenants, where M is an integer greater than 0, and the filtering out, from the computing task of the at least one tenant, a computing task of m tenants that does not meet the sharing policy and the borrowing policy includes filtering out, from the computing task of the M tenants, a computing task of p tenants based on the identifier information of the first node and the sharing policy, filtering out, from the computing task of the M tenants, a computing task of q tenants based on the identifier information of the first node and the borrowing policy, and obtaining an intersection of a computing task of remaining (M-p) tenants and a computing task of remaining (M-q) tenants.

In an embodiment, the foregoing two steps of filtering using the sharing policy and filtering using the borrowing policy are performed in no particular order, and may be simultaneously performed. This is not limited in this embodiment of this application. In such a filtering manner, the p tenants and the q tenants possibly include a same tenant. However, this does not affect a final filtering result. It should be understood that the main resource-control node may filter out, in different filtering sequences, the computing task that does not meet the sharing policy and the borrowing policy. In an embodiment, the main resource-control node may first filter out the computing task based on the sharing policy and then filter out the computing task based on the borrowing policy, may first filter out the computing task based on the borrowing policy and then filter out the computing task based on the sharing policy, or may filter out the computing task based on each of the sharing policy and the borrowing policy and finally obtain an intersection of two filtering results. This is not limited in this embodiment of this application.

With reference to the foregoing possible implementations of the second aspect, in a fourth possible implementation of the second aspect, the first node is a node in a first resource zone RZ, a node included in the first resource zone has a same sharing policy, and the same sharing policy is a sharing policy of the first resource zone.

In an embodiment, nodes in the system may be grouped into a plurality of resource zones RZs, and the plurality of RZs include a reserved resource zone RRZ and a shared resource zone (SRZ). In this case, a sharing policy of an RZ is a sharing policy of each node in the RZ, a resource provider is the RZ, and a resource user is a tenant and a computing task of the tenant. For the RRZ, the RRZ is allocated to a specific tenant. From this perspective, the tenant possibly has a dual identity as both a resource provider and a resource borrower.

It should be understood that an RZ should include only nodes having a same sharing policy. The same sharing policy is a sharing policy of the RZ. A tenant that has use permission for an RZ may be determined based on a sharing policy of the RZ. Optionally, the use permission may include use of a storage resource and a computing resource in order to implement integration of a storage system and a computing system. That is, the storage resource and the computing resource are considered as a whole. In addition, from an aspect of deployment, it is acceptable that a sharing policy is set for an RZ, with no need to set a sharing policy for each node. This helps reduce setting complexity.

With reference to the foregoing possible implementations of the second aspect, in a fifth possible implementation of the second aspect, the sharing policy is any one of the following policies. a strict reservation policy, a share-upon-idleness policy, or a fair sharing policy, where the strict reservation policy is used to indicate that a computing resource of the first node is allowed to be used for only the computing task of the i tenants, the share-upon-idleness policy is used to indicate that a tenant other than the i tenants is allowed to use the computing resource of the first node only when the first node is idle, and the fair sharing policy is used to indicate that the at least one tenant is allowed to fairly use the computing resource of the first node.

In an embodiment, the strict reservation policy, the share-upon-idleness policy, and the fair sharing policy may be sharing policies of nodes, or may be sharing policies of RZs. In other words, the main resource-control node further distinguishes, based on a sharing policy of each RZ, an RZ available to a tenant, especially an RRZ and an SRZ. The strict reservation policy means reserving a resource strictly. In the strict reservation policy, only a tenant to which an RZ belongs is allowed to use a resource in the RZ, and another tenant is not allowed to use the resource even if the resource is idle. In the share-upon-idleness policy, a resource of the RZ is reserved for the tenant to which the RZ belongs, but another tenant is allowed to temporarily borrow the resource when the resource is idle; when needing the resource, the tenant to which the RZ belongs preempts the resource based on a highest priority, and it is ensured that the tenant to which the RZ belongs has a 100% weight on the resource in the RZ. The fair sharing policy means that a plurality of tenants share a resource. In the fair sharing policy, the RZ allows a plurality of tenants to fairly use the resource in the RZ based on weights that are agreed upon. RZs of different properties can be generated based on the foregoing different policies. For example, an RZ that has a fair sharing policy is an SRZ, and an RZ that has a strict reservation policy is an RRZ.

It should be understood that this embodiment of this application is described using only the foregoing three sharing policies as an example, and a system administrator or a tenant may further set another different sharing policy for a node or an RZ. This is not limited in this embodiment of this application.

With reference to the foregoing possible implementations of the second aspect, in a sixth possible implementation of the second aspect, a third tenant in the at least one tenant is initially configured with at least one third node, and a borrowing policy of the third tenant includes, when a quantity of available nodes in the at least one third node is less than a first threshold, the third tenant is allowed to borrow the computing resource of the first node; and/or when a quantity of nodes borrowed by the third tenant is greater than a second threshold, the third tenant is not allowed to borrow the computing resource of the first node, where the at least one third node does not include the first node.

In an embodiment, a borrowing policy of a tenant may be configured by the tenant and stored in a database. The tenant usually owns a node resource. In other words, the system initially configures a part of node resources to provide a service for the tenant. For example, a tenant A corresponds to a first RRZ, and the tenant A can use a resource in the first RRZ. If resources in the first RRZ are insufficient, the tenant A needs to borrow a resource. In this case, the tenant A may set a borrowing policy of the tenant A. The borrowing policy may be that the tenant A is allowed to borrow a resource when a quantity of resources available to the tenant A is less than a first threshold. In this case, when the first threshold is 0, the borrowing policy of the tenant A is that the tenant A can never borrow a shared resource. When the first threshold is large enough, the borrowing policy of the tenant A is that the tenant A can always borrow a shared resource. In addition, the borrowing policy may be that the tenant A is no longer allowed to borrow a resource when a quantity of resources borrowed by the tenant A is greater than a second threshold, or may be another policy. This is not limited in this embodiment of this application.

With reference to the foregoing possible implementation of the second aspect, in a seventh possible implementation of the second aspect, the borrowing policy further includes the third tenant preferentially uses a fourth node, where the fourth node stores data corresponding to a computing task of the third tenant, and the fourth node belongs to a node resource of the third tenant.

In an embodiment, a computing location of a computing task may be optimized by setting a borrowing policy of a tenant. To be specific, the computing task is preferentially scheduled at a storage node of data corresponding to the computing task. This can improve system performance and data security.

According to a third aspect, a data storage apparatus is provided, configured to execute the method in any one of the first aspect or the possible implementations of the first aspect. In an embodiment, the apparatus includes units configured to execute the method in any one of the first aspect or the possible implementations of the first aspect.

According to a fourth aspect, a task allocation apparatus is provided, configured to execute the method in any one of the second aspect or the possible implementations of the second aspect. In an embodiment, the apparatus includes units configured to execute the method in any one of the second aspect or the possible implementations of the second aspect.

According to a fifth aspect, a data storage apparatus is provided, where the apparatus includes a transceiver, a memory, and a processor. The transceiver, the memory, and the processor communicate with each other using an internal connection path. The memory is configured to store an instruction. The processor is configured to execute the instruction stored in the memory, to control a receiver to receive a signal and control a transmitter to send a signal. In addition, when the processor executes the instruction stored in the memory, the execution causes the processor to execute the method in any one of the first aspect or the possible implementations of the first aspect.

According to a sixth aspect, a task allocation apparatus is provided, where the apparatus includes a transceiver, a memory, and a processor. The transceiver, the memory, and the processor communicate with each other using an internal connection path. The memory is configured to store an instruction. The processor is configured to execute the instruction stored in the memory, to control a receiver to receive a signal and control a transmitter to send a signal. In addition, when the processor executes the instruction stored in the memory, the execution causes the processor to execute the method in any one of the second aspect or the possible implementations of the second aspect.

According to a seventh aspect, a computer readable storage medium is provided, configured to store a computer program. The computer program includes an instruction used to execute the method in any one of the first aspect or the possible implementations of the first aspect.

According to an eighth aspect, a computer readable storage medium is provided, configured to store a computer program. The computer program includes an instruction used to execute the method in any one of the second aspect or the possible implementations of the second aspect.

DESCRIPTION OF EMBODIMENTS

The following describes the technical solutions in the embodiments of this application with reference to the accompanying drawings in the embodiments of this application.

First, a big data system and a multi-tenant technology related to the embodiments of this application are described.

"Big data" is a voluminous data set collected in diverse forms and from many sources, and is usually real-time. In a case of business-to-business sales, the data is possibly obtained from a social network, an e-commerce network, a customer visit record, and many other sources. From a perspective of technology, a relationship between big data and cloud computing is as close as that between a top side and a bottom side of a coin. Big data inevitably cannot be processed using a single computer, and needs to be processed using a distributed computing architecture. Therefore, a feature of big data is massive-data mining, and massive-data mining needs to rely on distributed processing of cloud computing, a distributed database, cloud storage and/or a virtualization technology, and the like.

The multi-tenant technology, also referred to as a multi-leasing service technology, is a software architecture technology that allows sharing of a same system or program component in a multiuser environment and that can ensure data isolation between users. In a big data environment, implementation of the multi-tenant technology requires a resource pool or a job pool. Each resource pool includes a specific quantity of resources (configured by an administrator). Each tenant corresponds to a resource pool, and a resource in the resource pool can be used for a job submitted by the tenant in order to satisfy requirements such as data storage and computing-job running.

From a perspective of technical implementation, a big data system is also referred to as a multinode cluster. The cluster includes a plurality of cluster nodes. A larger quantity of cluster nodes indicates a larger cluster scale and a stronger data processing capability of the big data system. When a plurality of tenants share one cluster, unified operation and maintenance management (OMM) software is required for performing unified management. Therefore, one tenant may be corresponding to at least one node, and the OMM software of the big data system performs unified management.

Figure 1:
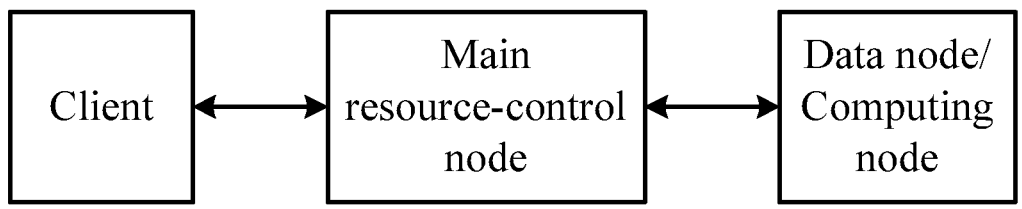
FIG. 1 is a schematic diagram of an application scenario according to an embodiment of this application.

FIG. 1 is a schematic diagram of an application scenario 100 according to an embodiment of this application. The application scenario 100 includes a client 110, a main resource-control node 120, and a data node/computing node 130.

In an embodiment, the client 110 corresponds to a first tenant. The first tenant may send to-be-stored data and/or submit a computing job to the main resource-control node 120 using the client 110, to request the main resource-control node 120 to allocate a corresponding resource to the first tenant in order to store the data and/or run the computing job.

The main resource-control node 120 is a management node, and is configured to manage all data nodes/computing nodes in a cluster. In a possible implementation, the foregoing OMM software may be installed in the main resource-control node 120, to implement unified management of nodes in the big data system using the software.

The data node/computing node 130 is any node in a cluster of the big data system, and is configured to implement tenant data storage and/or computing-job running. It should be understood that a node in the cluster may be a data node configured to store data of a tenant, or may be a computing node configured to complete a computing task of a tenant. Therefore, a node may include a storage resource and/or a computing resource. The storage resource includes all resources with a storage capability in the node, for example, a magnetic disk, a flash memory, and a memory, and may be used to store data of a tenant. The computing resource is used to complete various computing tasks that are submitted by a tenant using the client 110.

It should be further understood that FIG. 1 shows only one client and one data node/computing node as an example. Optionally, the application scenario 100 may alternatively include a plurality of data nodes/computing nodes and a plurality of clients corresponding to a plurality of tenants. This is not limited in this embodiment of this application.

Figure 2:
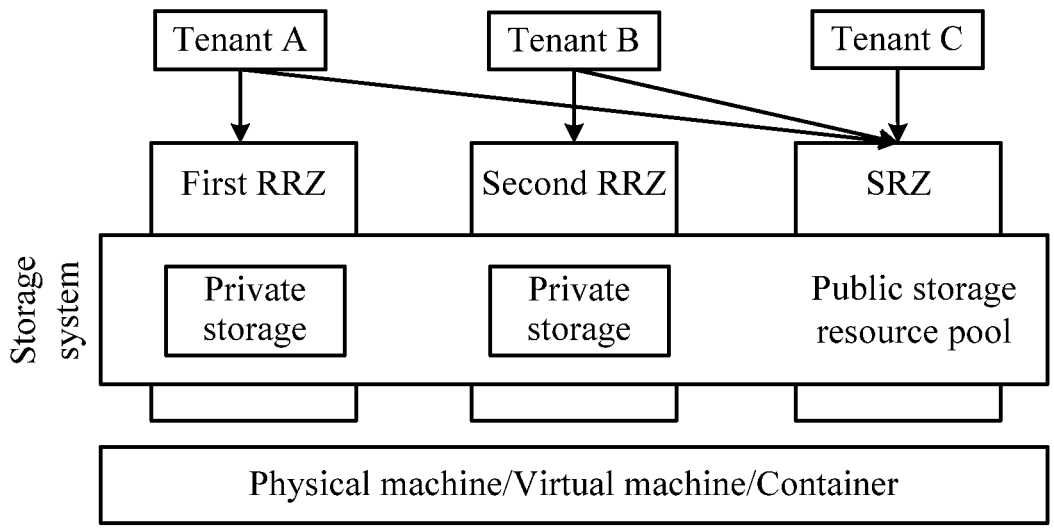
FIG. 2 is a schematic diagram of a system architecture according to an embodiment of this application.

FIG. 2 is a schematic diagram of a system architecture 200 according to an embodiment of this application. In an embodiment, the system architecture 200 includes three tenants (a tenant A, a tenant B, and a tenant C), three RZs, and nodes corresponding to the three RZs. Each of the three RZs has a respective resource sharing policy, used to indicate which tenants can use a node resource of the RZ. In an embodiment, the three RZs may include a first RZ, a second RZ, and a third RZ. In a preset resource sharing policy, each tenant has different use permission. For example, the first RZ can be used by all the tenants, the second RZ can be used by only the tenant B, and the third RZ can be used by only the tenant C. For another example, the first RZ can be used by the tenant A and the tenant B, the second RZ can be used by the tenant B and the tenant C, and the third RZ can be used by only the tenant B. This is not limited in this embodiment of this application.

Optionally, the three RZs include a first RRZ, a second RRZ, and a shared resource zone (SRZ). It should be understood that a difference between the RRZ and the SRZ is that resource sharing policies of the RRZ and the SRZ are different. The SRZ can be used by all the tenants, the first RRZ can be used by only the tenant A, and the second RRZ can be used by only the tenant B. Therefore, the RZs are corresponding to a public storage resource pool and a private storage resource pool, respectively. The system architecture 200 reflects a correspondence between a resource zone of a storage system and a tenant on a big data platform, and is used to implement tenant data storage.

It should be understood that the nodes corresponding to the RZs may be physical machines, may be virtual machines, or may be containers. This is not limited in this embodiment of this application.

It should be further understood that FIG. 2 shows only three tenants and three RZs as an example. Optionally, the system architecture 200 may alternatively include a larger plurality of tenants and a larger plurality of RZs corresponding to the larger plurality of tenants. This is not limited in this embodiment of this application. Usually, there is only one SRZ.

For a multi-tenant big data system, a big data cluster may simultaneously serve a plurality of tenants. Usually, tenants may be classified into two types. A first type is a large-scale tenant whose service is mature and relatively stable. A service type of such a tenant is relatively definite, and a service scale of such a tenant sees a steady growth. In this embodiment of this application, this type of tenant may create RRZ space based on a daily stable resource requirement of the tenant, without affecting performance in a running period, where an RRZ is an isolated resource reserved for the tenant. A second type of tenant is a small-scale tenant that is in a growing period and that has relatively large uncertainty. A service requirement of such a tenant is unstable, and a resource requirement of such a tenant is difficult to fix. For this type of tenant, an RRZ may not be created, and the resource requirement may be satisfied using an SRZ in a long term.

Different from an isolation manner in which a cluster is exclusive to a tenant, an RRZ has a good elastic scaling capability. For a change in a stable resource requirement of a tenant, a resource can be easily moved from an SRZ to an RRZ, or a resource can be easily returned from an RRZ to an SRZ. In this way, the tenant does not need to wait for a long time that is spent on a server procurement process, and a waste of idle resources is avoided. Therefore, this reflects a scaling capability of the RZ. In addition, when RRZ resources are insufficient, the tenant may temporarily borrow an SRZ resource, to deal with an unexpected resource requirement and an expected resource requirement peak, and to avoid resource idleness and a waste of resources caused by the RRZ.

Figure 3:
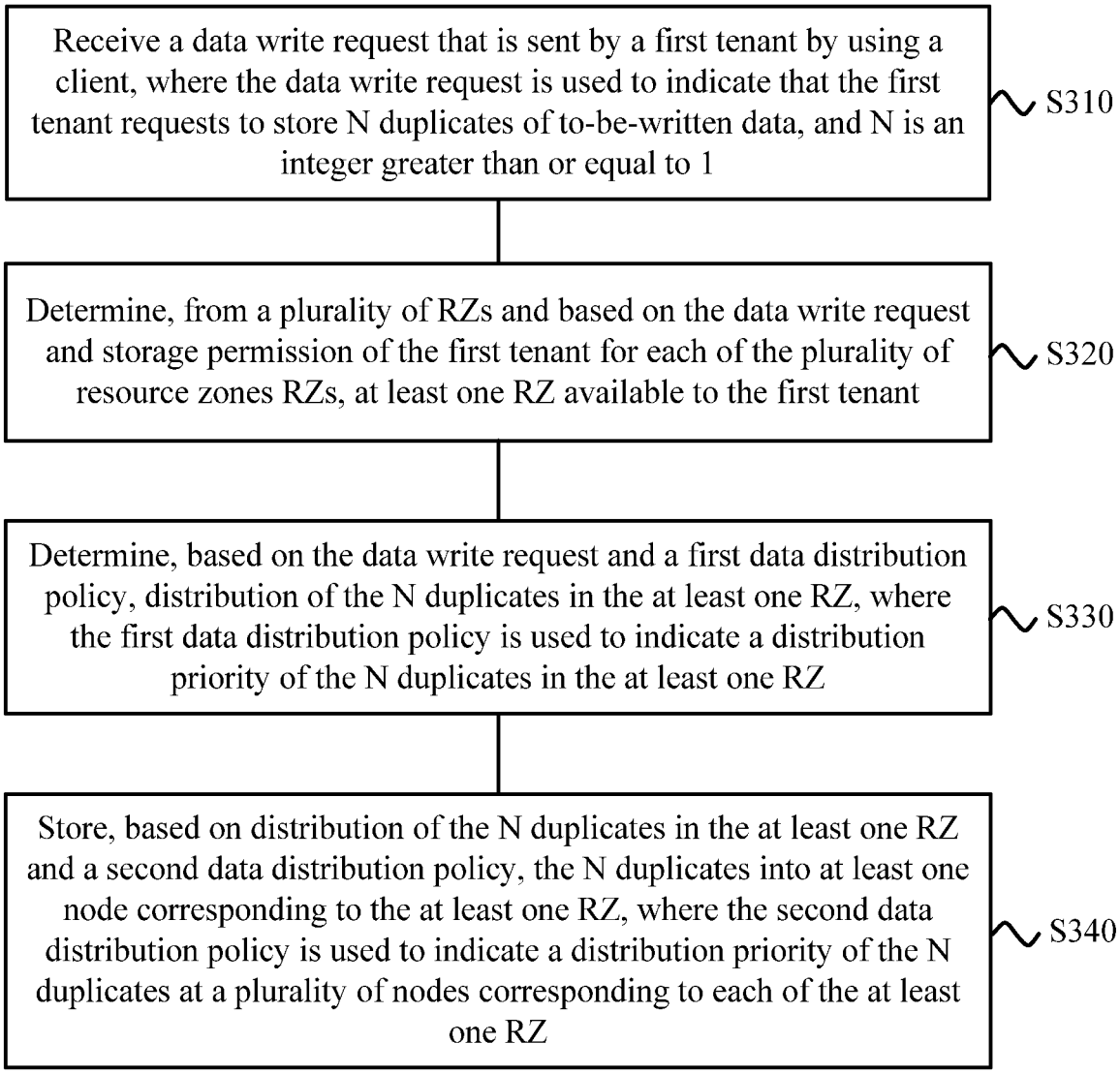
FIG. 3 is a schematic flowchart of a data storage method according to an embodiment of this application.

FIG. 3 is a schematic flowchart of a data storage method 300 according to an embodiment of this application. The method 300 may be applied to the application scenario 100 shown in FIG. 1 and the system architecture 200 shown in FIG. 2. However, this embodiment of this application is not limited thereto.

S310: Receive a data write request that is sent by a first tenant using a client, where the data write request is used to indicate that the first tenant requests to store N duplicates of to-be-written data, and N is an integer greater than or equal to 1.

S320: Determine, from a plurality of RZs and based on the data write request and storage permission of the first tenant for each of the plurality of resource zones RZs, at least one RZ available to the first tenant.

S330: Determine, based on the data write request and a first data distribution policy, distribution of the N duplicates in the at least one RZ, where the first data distribution policy is used to indicate a distribution priority of the N duplicates in the at least one RZ.

S340: Store, based on distribution of the N duplicates in the at least one RZ and a second data distribution policy, the N duplicates into at least one node corresponding to the at least one RZ, where the second data distribution policy is used to indicate a distribution priority of the N duplicates at a plurality of nodes corresponding to each of the at least one RZ.

In an embodiment, in this embodiment of this application, a cluster in a big data system is divided into a plurality of RZs. Each of the plurality of RZs includes at least one node, and each of the plurality of RZs has a resource sharing policy. The resource sharing policy is used to indicate storage permission of a tenant in the big data system for each RZ. Based on the resource sharing policy of each of the plurality of RZs, allocating a storage resource to a tenant in an RZ for which the tenant has no storage permission is unauthorized. A main resource-control node needs to allocate different storage resources (that is, RZs) to different tenants according to the resource sharing policies, to ensure normal running of the big data system.

It should be understood that a resource sharing policy of an RZ may be preconfigured, and may be further described in a plurality of manners. This is not limited in this embodiment of this application. In a possible implementation, the system may establish a resource sharing policy of an RZ using a correspondence between an RZ identifier and a tenant identifier, as shown in the following table.

| RZ identifier | Tenant identifier |
| --- | --- |
| 1 | * |
| 2 | 1 |
| 3 | 3, 4 |
| 4 | foo_* |

In the table, * is a wildcard character. The foregoing resource sharing policy is that all tenants can be allowed to store data in an RZ1, only a tenant 1 can be allowed to store data in an RZ2, a tenant 3 and a tenant 4 can be allowed to store data in an RZ3, and a tenant with a tenant identifier whose first three letters are foo can be allowed to store data in an RZ4. It should be understood that the foregoing RZ identifier and/or tenant identifier may be alternatively denoted using characters of any other length, provided that the RZ and/or the tenant can be identified. This is not limited in this embodiment of this application.

It should be noted that the storage permission herein is reflected in only data placement, and the storage permission does not include access limitation of existing data in the resource zone. A HDFS is used as an example. The tenant 1 does not have data storage permission for the RZ3. However, whether the tenant 1 can access data in the RZ3 depends on an access control list (ACL) setting in the HDFS.

In the data storage method in this embodiment of this application, when the first tenant needs to store data, the first tenant may send the data write request to the main resource-control node using the corresponding client, where the data write request is used to indicate that the first tenant requests to store the N duplicates of the to-be-written data. The data write request may carry the N duplicates of the to-be-written data, or may carry one duplicate of the to-be-written data and a quantity N of the duplicates that the first tenant requests to store. This is not limited in this embodiment of this application. The main resource-control node receives the data write request, and determines, from the plurality of RZs and based on the data write request and the storage permission of the first tenant for each of the plurality of RZs, the at least one RZ available to the first tenant. In the foregoing example, if an identifier of the first tenant is 1, the at least one RZ is the RZ1 and the RZ2. Then, the main resource-control node stores, based on the data write request, the first data distribution policy, and the second data distribution policy, the N duplicates into the at least one node corresponding to the at least one RZ.

It should be understood that the first data distribution policy and the second data distribution policy may be preconfigured, and are used to determine distribution of the N duplicates. In an embodiment, the first data distribution policy is used to indicate the distribution priority of the N duplicates in the at least one RZ, and the second data distribution policy is used to indicate the distribution priority of the N duplicates at the plurality of nodes corresponding to each of the at least one RZ. Therefore, data placement decision of the main resource-control node is implemented in the following two phases.

(1) Distribution of the N duplicates in the at least one RZ is determined based on the data write request and the first data distribution policy.

It should be understood that distribution herein refers to a correspondence between the N duplicates and the at least one RZ. For example, N=5, and the at least one RZ available to the first tenant is an RZ1 and an RZ2. In this case, according to the first data distribution policy, the five duplicates may be distributed in the two RZs as follows. Two duplicates are distributed in the RZ1, and three duplicates are distributed in the RZ2.

(2) Distribution of the N duplicates at the at least one node corresponding to the at least one RZ is determined based on distribution of the N duplicates in the at least one RZ and the second data distribution policy.

In this embodiment of this application, in the foregoing two phases, different polices may be independently applied based on different tenant requirements or different application scenarios faced by the tenant, and are combined to produce an expected data distribution result, with no need to preconfigure a data distribution policy for a data distribution result corresponding to each application scenario. First, nodes available to the tenant are grouped into the at least one resource zone RZ, the first data distribution policy is configured for the at least one RZ, and the second data distribution policy is configured for the nodes corresponding to the at least one RZ. During data storage, the main resource-control node may perform two-phase decision. In the first phase, data duplicate distribution in the at least one RZ is determined according to the first data distribution policy. In the second phase, data duplicate distribution at a specific node is determined based on the first phase and with reference to the second data distribution policy.

Therefore, according to the data storage method in this embodiment of this application, the nodes available to the tenant are grouped into the at least one resource zone RZ, the first data distribution policy is configured for the at least one RZ, and the second data distribution policy is configured for the nodes corresponding to the at least one RZ. During data storage, the main resource-control node may perform two-phase decision according to the first data distribution policy and the second data distribution policy. Policies in the two phases may be independently configured such that the main resource-control node can combine data distribution policies in the different phases, and flexibly control, based on different tenant requirements and a scenario faced by the tenant, distribution of to-be-stored data of the tenant at the node, thereby reducing policy deployment complexity.

It should be understood that the resource sharing policy and the data distribution policy coordinate with each other and restrict each other. The at least one RZ available to the first tenant has different resource sharing policies. Therefore, data may be stored based on different tenant requirements and using different data distribution policies in order to achieve different effects. An advantage of introducing two-phase decision is that, in the two phases, different policies can be independently applied and be combined to generate an expected effect. Otherwise, each combination possibility needs to be implemented using a specific policy.

It should be further understood that the method 300 may be executed by the main resource-control node 120 in the application scenario 100. However, this is not limited in this embodiment of this application.

In an optional embodiment, the at least one RZ includes a first RZ and a second RZ, the first RZ is a RRZ that only the first tenant is allowed to use, and the second RZ is a shared resource zone (SRZ) that a plurality of tenants including the first tenant are allowed to use.

In an embodiment, the at least one RZ available to the first tenant may include the first RZ that only the first tenant is allowed to use and the second RZ that the plurality of tenants including the first tenant are allowed to use. In the foregoing example, the first RZ is the RZ2, and the second RZ is the RZ1. In this case, based on the foregoing data distribution policies, the N duplicates may be placed at nodes corresponding to the RZ1 and the RZ2.

For example, N=3, in other words, the quantity of duplicates of the to-be-written data is 3. In this case, in the first phase, the main resource-control node determines to place two of the duplicates in the RZ2, and place one remaining duplicate in the RZ1, in the second phase, the main resource-control node may preferentially select, from the RZ2, two nodes whose remaining space is large, to place the two duplicates, and preferentially select, from the RZ1, one node whose remaining space is large, to place the one duplicate.

It should be understood that the first data distribution policy may be that the data is preferentially stored in the first RZ, or may be that some of the duplicates are always stored in the second RZ. This is not limited in this embodiment of this application. The second data distribution policy may be an equiprobability distribution policy, may be a different-probability distribution policy considering remaining node space, or may be another policy customized based on a specific scenario. This is not limited in this embodiment of this application, either. Therefore, various expected effects can be achieved under different combinations of the first data distribution policy and the second data distribution policy.

In an optional embodiment, the first data distribution policy is that the N duplicates are preferentially stored into the first RZ, and the determining, based on the data write request and a first data distribution policy, distribution of the N duplicates in the at least one RZ includes determining, based on the data write request, the first data distribution policy, and a space occupation status of the first RZ, that the first RZ is capable of storing P duplicates of the to-be-written data, where P is an integer greater than or equal to 1, and the space occupation status is used to indicate a size of occupied space of the first RZ or a size of remaining space of the first RZ, and when N is less than or equal to P, determining that the N duplicates are distributed in the first RZ, or when N is greater than P, determining that the P duplicates in the N duplicates are distributed in the first RZ, and a duplicate, other than the P duplicates, in the N duplicates is distributed in the second RZ.

In an embodiment, when the first data distribution policy is that the N duplicates are preferentially stored into the first RZ, the main resource-control node may determine, based on the data write request, the first data distribution policy, and the space occupation status of the first RZ, that the first RZ is capable of storing the P duplicates of the to-be-written data. If N is less than or equal to P, the main resource-control node may store all of the N duplicates into the first RZ, to implement preferential storage in the first RZ. If N is greater than P, the main resource-control node may store the P duplicates of the to-be-written data into the first RZ, and store remaining (N-P) duplicates into the second RZ.

In this embodiment of this application, the data of the tenant may be stored in the RRZ (that is, the first RZ) of the tenant as far as possible, to reduce usage of the SRZ (that is, the second RZ) as far as possible. From a perspective of costs of the tenant, the RRZ usually belongs to a prepaid resource of the tenant, and the SRZ belongs to a postpaid resource that is paid for based on a quantity. Less SRZ usage indicates fewer generated additional costs. From a perspective of platform operation, RRZ space is usually reserved for and exclusive to the tenant, and higher RRZ usage indicates higher platform resource usage.

It should be understood that the space occupation status may be space usage, remaining space, or the like of the RZ. This is not limited in this embodiment of this application. Optionally, in such a policy, the system may set a space usage threshold or a remaining space threshold for the RRZ. The first tenant can use a storage resource of the SRZ only when the space usage of the RRZ reaches the threshold. Therefore, the main resource-control node may determine, based on the data write request, the first data distribution policy, and the space occupation status and a space usage threshold of the first RZ, a quantity of duplicates of the to-be-written data that can be stored in the first RZ. This is not limited in this embodiment of this application.

In an optional embodiment, the first data distribution policy is that Q duplicates in the N duplicates are stored into the second RZ, where Q is an integer greater than or equal to 1, and Q is less than or equal to N, and the determining, based on the data write request and a first data distribution policy, distribution of the N duplicates in the at least one RZ includes determining, based on the data write request and the first data distribution policy, that the Q duplicates in the N duplicates are distributed in the second RZ, and remaining (N-Q) duplicates, other than the Q duplicates, in the N duplicates are distributed in the first RZ.

In an embodiment, when the first data distribution policy is that the Q duplicates in the N duplicates are stored into the second RZ, the main resource-control node may determine, based on the data write request and the first data distribution policy, to store the Q duplicates of the to-be-written data into the second RZ, and store the remaining (N-Q) duplicates into the first RZ.

In this embodiment of this application, the tenant is allowed to specify storage quantities of data duplicates in different RZs. This policy is applicable to different scenarios. Examples are as follows. (1) For a purpose of maximum data access superposition bandwidth, data is usually accessed by computing that runs on the SRZ (that is, the second RZ). However, if most data duplicates are concentrated in the RRZ (that is, the first RZ), data access bandwidth is limited by a quantity of nodes of the RRZ, and as a result, a computing concurrency capability is limited. In this case, a better choice is to always store a specific quantity of data duplicates in the SRZ regardless of remaining space of the RRZ. (2) Tenants share data with each other, that is, the data is shared with another tenant after the data is generated. If data duplicates are concentrated in the RRZ, the other tenant also occupies an input/output I/O resource of the RRZ when accessing the data, and as a result, interference is caused to performance of an application of the tenant in the RRZ. In this case, interference to RRZ performance can be avoided by placing some of the data duplicates in the SRZ.

In a possible implementation, a tenant A requests data write, a quantity of duplicates of to-be-written data is 3, an expected data distribution policy of the tenant A is that an RRZ is preferential, and using SRZ space when RRZ space usage reaches 90% is set. A data write request is sent from a client of the tenant A to a NameNode node of a server side. The NameNode node is the foregoing main resource-control node. The NameNode node selects three nodes for the tenant to store different duplicates. At this moment, RRZ space usage is less than 90%. The NameNode node selects three nodes, a node A, a node B, and a node C, in the RRZ, and informs the client of the three nodes. The client sends the data write request to the three nodes. After the data duplicates are written, the client continues to request to write three duplicates. A new data write request is sent to the NameNode node. The NameNode node finds that RRZ space usage has reached 90%, and therefore selects three nodes, a node X, a node Y, and a node Z, in an SRZ. The NameNode node determines to store subsequent duplicates into the node X, the node Y, and the node Z.

In an optional embodiment, the determining, based on the data write request and the first data distribution policy, that remaining (N-Q) duplicates, other than the Q duplicates, in the N duplicates are distributed in the first RZ includes determining, based on the data write request, the first data distribution policy, and a space occupation status of the first RZ, that the first RZ is capable of storing P duplicates of the to-be-written data, where P is an integer greater than or equal to 1, and the space occupation status is used to indicate a size of occupied space of the first RZ or a size of remaining space of the first RZ; and when N-Q is less than or equal to P, determining that the (N-Q) duplicates are distributed in the first RZ, or when N-Q is greater than P, determining that the P duplicates in the (N-Q) duplicates are distributed in the first RZ, and a duplicate, other than the P duplicates, in the (N-Q) duplicates is distributed in the second RZ.

In an embodiment, when the first data distribution policy is that the Q duplicates in the N duplicates are preferentially stored into the second RZ, the remaining (N-Q) duplicates need to be placed in the first RZ according to the first data distribution policy. However, memory of the first RZ is limited and is possibly insufficient to store the (N-Q) duplicates. Therefore, the main resource-control node needs to determine distribution of the remaining (N-Q) duplicates based on the space occupation status of the first RZ. The main resource-control node may first determine, based on the data write request, the first data distribution policy, and the space occupation status of the first RZ, that the first RZ is capable of storing the P duplicates of the to-be-written data. If N-Q is less than or equal to P, the main resource-control node may determine to store all of the (N-Q) duplicates into the first RZ. If N-Q is greater than P, the main resource-control node may store the P duplicates of the to-be-written data into the first RZ, and store remaining (N-Q-P) duplicates into the second RZ.

In an optional embodiment, the method further includes storing, based on the space occupation status of the first RZ, all or some of duplicates in the second RZ into the first RZ, where the space occupation status is used to indicate the size of the occupied space of the first RZ or the size of the remaining space of the first RZ, and deleting the all or some of duplicates from the second RZ.

Optionally, after storing the N duplicates of the to-be-written data into the first RZ and the second RZ, the main resource-control node may further delete a stored duplicate based on a tenant requirement. After M duplicates of the to-be-written data are deleted from the first RZ, space of the first RZ becomes larger, and the main resource-control node may migrate a duplicate from the second RZ to the first RZ. It should be understood that duplicate sizes are different for different data. The main resource-control node needs to determine, based on the space occupation status of the first RZ, a data volume that can be migrated from the second RZ to the first RZ.

Optionally, a space usage threshold may be set. When space usage of the first RZ is less than the space usage threshold, the main resource-control node may migrate a duplicate from the second RZ to the first RZ.

In this way, RRZ usage can be improved. Because the RRZ is reserved for and exclusive to the tenant, generally, higher RRZ usage indicates higher resource usage of the big data system.

In an optional embodiment, before the receiving a data write request that is sent by a first tenant using a client, the method further includes receiving a resource zone creation request, where the resource zone creation request is used to request to create, for the first tenant, a third RZ in the at least one RZ, creating the third RZ based on the resource zone creation request, and determining a plurality of first nodes corresponding to the third RZ, adding first label information for each of the plurality of first nodes, where the first label information is used to identify the third RZ, and adding a first resource sharing policy for the third RZ, where the first resource sharing policy is used to indicate that the third RZ can be accessed by at least one tenant including the first tenant.

In an embodiment, the main resource-control node may receive the resource zone creation request, to create the third RZ for the first tenant. The third RZ belongs to the at least one RZ available to the first tenant. When creating the third RZ, the main resource-control node needs to determine the plurality of first nodes corresponding to the third RZ, and add the first label information for each of the plurality of first nodes. The first label information is used to identify the third RZ. In addition, the main resource-control node further needs to add the first resource sharing policy for the third RZ. The first resource sharing policy is used to indicate that the third RZ can be accessed by the at least one tenant including the third tenant.

It should be understood that the label information is stored in an OMM database. To prevent processing performance of a storage system from being affected due to access dependence of the storage system on OMM during use, the label information is usually synchronized from an OMM system to the storage system (for example, an HDFS). Therefore, a different storage zone is formed for the label information in the storage system and corresponds to the RZ. Based on the label information, the main resource-control node may determine a specific duplicate placement node according to the data distribution policies.

In an optional embodiment, the method further includes receiving a resource zone deletion request, where the resource zone deletion request is used to request to delete a fourth RZ in the at least one RZ; deleting, based on the resource zone deletion request, duplicates stored at a plurality of second nodes corresponding to the fourth RZ; deleting second label information of each of the plurality of second nodes, where the second label information is used to identify the fourth RZ; and deleting a second resource sharing policy of the fourth RZ, where the second resource sharing policy is used to indicate that the fourth RZ can be accessed by at least one tenant including the first tenant.

In an embodiment, the main resource-control node may receive the resource zone deletion request, and determine to delete the fourth RZ in the at least one RZ. The main resource-control node may delete the data duplicates stored at the plurality of second nodes corresponding to the fourth RZ, and then delete the second label information of each of the plurality of second nodes and the second resource sharing policy of the fourth RZ.

In an optional embodiment, the method further includes receiving a resource zone expansion request, where the resource zone expansion request is used to request to expand a fifth RZ in the at least one RZ, determining at least one third node based on the resource zone expansion request, and adding third label information for each of the at least one third node, where the third label information is used to identify the fifth RZ.

In an optional embodiment, the method further includes receiving a resource zone shrinking request, where the resource zone shrinking request is used to request to shrink a sixth RZ in the at least one RZ, determining, based on the resource zone shrinking request, at least one fourth node corresponding to the sixth RZ, and deleting fourth label information of each of the at least one fourth node, where the fourth label information is used to identify the sixth RZ.

It should be understood that the foregoing resource zone management operations such as creation, deletion, expansion, and shrinking may be completed by the OMM system. Usually, a platform administrator performs an OMM operation. A cloud scenario is relatively special. In the cloud scenario, the tenant (possibly an administrator of the tenant) completes RZ management and maintenance in a self-service manner using the OMM system. This is not limited in this embodiment of this application.

It should be understood that the sequence numbers of the foregoing processes do not indicate an execution sequence. An execution sequence of the processes should be determined based on functions and internal logic of the processes, but should not constitute any limitation on an implementation process of this embodiment of this application.

Figure 4:
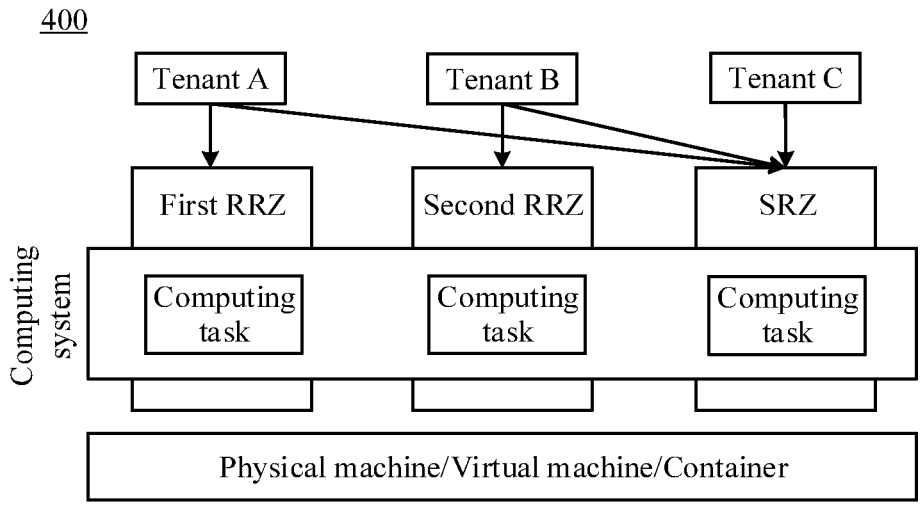
FIG. 4 is a schematic diagram of another system architecture according to an embodiment of this application.

FIG. 4 is a schematic diagram of another system architecture 400 according to an embodiment of this application. In an embodiment, the system architecture 400 includes three tenants (a tenant A, a tenant B, and a tenant C), three resource zones (resource zone, RZ), and nodes corresponding to the three RZs. Each of the three RZs has a respective resource sharing policy, used to indicate which tenants can use a node resource of the RZ. In an embodiment, the three RZs may include a first RZ, a second RZ, and a third RZ. In a preset resource sharing policy, each tenant has different use permission. For example, the first RZ can be used by all the tenants, the second RZ can be used by only the tenant B, and the third RZ can be used by only the tenant C. For another example, the first RZ can be used by the tenant A and the tenant B, the second RZ can be used by the tenant B and the tenant C, and the third RZ can be used by only the tenant B. This is not limited in this embodiment of this application.

Optionally, the three RZs include a first RRZ, a second RRZ, and a shared resource zone (SRZ). According to different resource sharing policies, the SRZ can be used by all the tenants, the first RRZ can be used by only the tenant A, and the second RRZ can be used by only the tenant B. Therefore, each of the tenants may run a computing task in an RZ for which the tenant has computing permission. The system architecture 400 reflects a correspondence between a resource zone of a computing system and a tenant on a big data platform, and is used to implement various computing jobs of the tenant.

It should be understood that the nodes corresponding to the RZs may be physical machines, may be virtual machines, or may be containers. This is not limited in this embodiment of this application.

It should be further understood that FIG. 4 shows only three tenants and three RZs as an example. Optionally, the system architecture 400 may alternatively include a plurality of tenants and a plurality of RZs corresponding to the plurality of tenants. This is not limited in this embodiment of this application. Usually, there is only one SRZ.

Figure 5:
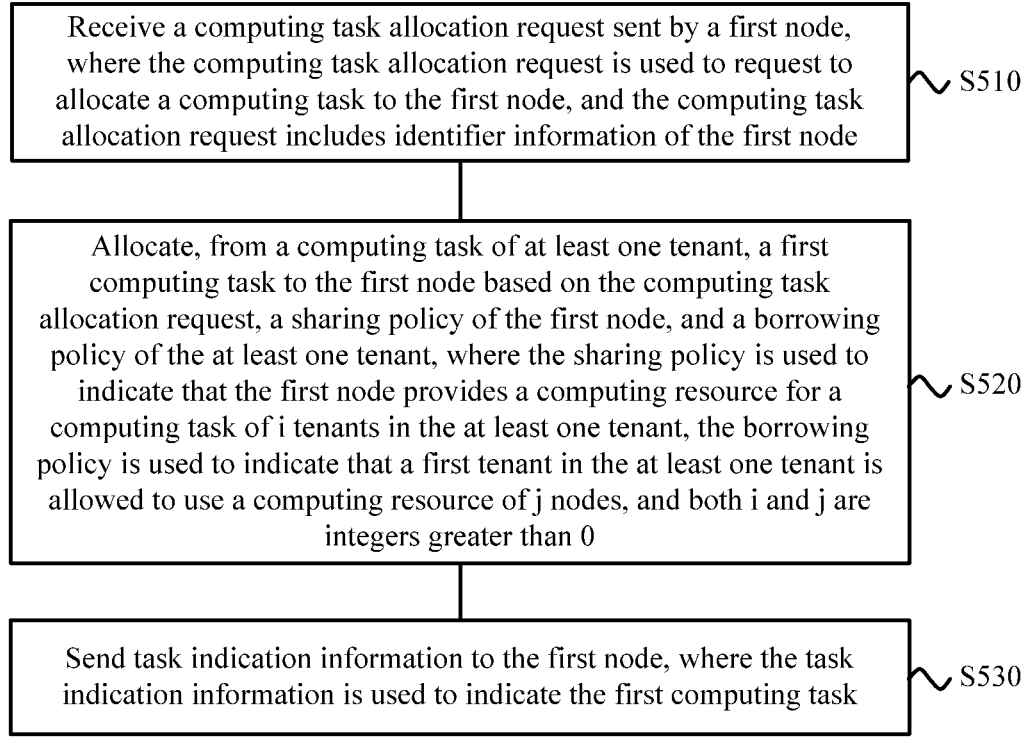
FIG. 5 is a schematic flowchart of a task allocation method according to an embodiment of this application.

FIG. 5 is a schematic flowchart of a task allocation method according to an embodiment of this application. The task allocation method 500 may be applied to the application scenario 100 shown in FIG. 1 and the system architecture 400 shown in FIG. 4. However, this embodiment of this application is not limited thereto.

S510: Receive a computing task allocation request sent by a first node, where the computing task allocation request is used to request to allocate a computing task to the first node.

S520: Allocate, from a computing task of at least one tenant, a first computing task to the first node based on the computing task allocation request, a sharing policy of the first node, and a borrowing policy of the at least one tenant, where the sharing policy is used to indicate that the first node provides a computing resource for a computing task of i tenants in the at least one tenant, the borrowing policy is used to indicate that a first tenant in the at least one tenant is allowed to use a computing resource of j nodes, and both i and j are integers greater than 0.

S530: Send task indication information to the first node, where the task indication information is used to indicate the first computing task.

In an embodiment, the method 500 may be executed by the main resource-control node 120 in the application scenario 100, and the first node may be the computing node 130 in the application scenario 100. The first node sends the computing task allocation request to the main resource-control node, that is, requests a task from the main resource-control node. The main resource-control node receives the computing task allocation request sent by the first node, determines, based on the sharing policy of the first node and the borrowing policy of the tenant in a big data system, to allocate the first computing task to the first node, and sends the task indication information to the first node.

It should be understood that the sharing policy is used to indicate which tenants the first node can provide a computing resource for, and the borrowing policy is used to indicate which nodes have resources that the tenant wants to use when node resources of the tenant are insufficient. These policies are usually configured in advance and stored in a database of big data system operation and maintenance management OMM software, and are usually configured by a system administrator and/or the tenant using the OMM software.

In this embodiment of this application, the node is a resource provider, and the tenant is a resource user. The sharing policy of the node is merely used to indicate how the resource provider shares a resource of the resource provider, and does not concern a specific resource user. The borrowing policy of the tenant is merely used to indicate how the resource user borrows an available shared resource, and does not concern a specific resource provider. This can decouple a resource sharing mechanism from a resource borrowing mechanism. In a multi-tenant scenario, a first benefit of such decoupling is that the resource provider and the resource consumer merely need to describe the sharing policy and the borrowing policy, respectively, with no need to establish a global view of resource planning. Compared with a current mainstream method, in this method, human does not need to perform comprehensive planning on resources to set a resource ratio that meets expectation. This is simple and convenient, especially when there is a relatively large quantity of tenants. A second benefit is that, from a perspective of responsibility and permission, an expression manner after decoupling makes it easier for the tenant to complete configuration in a self-service manner. For example, the resource provider may unilaterally adjust the borrowing policy without requiring any setting of the resource user.

Therefore, according to the task allocation method in this embodiment of this application, the main resource-control node flexibly performs, based on the computing-resource sharing policy of the computing node in the big data system and the computing-resource borrowing policy of the tenant, matching between the computing node and the computing task that is submitted by the tenant in order to allocate, to the computing node, a computing task that meets the policies. In this way, the resource sharing mechanism is decoupled from the resource borrowing mechanism. This is simple and easy to implement, and improves user experience.

In an optional embodiment, the allocating, from a computing task of at least one tenant, a first computing task to the first node based on the computing task allocation request, a sharing policy of the first node, and a borrowing policy of the at least one tenant includes performing, based on the computing task allocation request, matching between the computing task of the at least one tenant, and the sharing policy and the borrowing policy, filtering out, from the computing task of the at least one tenant, a computing task of m tenants that does not meet the sharing policy and the borrowing policy, where m is an integer greater than or equal to 1, and determining the first computing task from a remaining computing task other than the computing task of the m tenants.

In an embodiment, the main resource-control node may perform matching between at least one computing task in the system and the first node based on the sharing policy and the borrowing policy, and filter out the computing task that does not meet the sharing policy and the borrowing policy, to determine the first computing task to be allocated to the first node.

In an optional embodiment, the computing task allocation request includes identifier information of the first node, and the filtering out, from the computing task of the at least one tenant, a computing task of m tenants that does not meet the sharing policy and the borrowing policy includes filtering out a computing task of p first tenants based on the identifier information of the first node and the sharing policy, where the p first tenants do not belong to the i tenants, and p is an integer greater than or equal to 0, and filtering out, from a computing task of a remaining tenant other than the computing task of the p first tenants, a computing task of (m-p) second tenants based on the identifier information of the first node and the borrowing policy, where the first node does not belong to the j nodes.

In an optional embodiment, the filtering out, from the computing task of the at least one tenant, a computing task of m tenants that does not meet the sharing policy and the borrowing policy includes filtering out a computing task of (m-p) second tenants based on the identifier information of the first node and the borrowing policy, where a borrowing policy of the (m-p) second tenants indicates that using a computing resource of the first node is not allowed, and p is an integer greater than or equal to 0, and filtering out, from a computing task of a remaining tenant other than the computing task of the (m-p) second tenants, a computing task of p first tenants based on the identifier information of the first node and the sharing policy, where the p first tenants do not belong to the i tenants.

Optionally, the at least one tenant is M tenants, where M is an integer greater than 0, and the filtering out, from the computing task of the at least one tenant, a computing task of m tenants that does not meet the sharing policy and the borrowing policy includes filtering out, from the computing task of the M tenants, a computing task of p tenants based on the identifier information of the first node and the sharing policy, filtering out, from the computing task of the M tenants, a computing task of q tenants based on the identifier information of the first node and the borrowing policy, and obtaining an intersection of a computing task of remaining (M-p) tenants and a computing task of remaining (M-q) tenants.

In an embodiment, the foregoing two steps of filtering using the sharing policy and filtering using the borrowing policy are performed in no particular order, and may be simultaneously performed. This is not limited in this embodiment of this application. In such a filtering manner, the p tenants and the q tenants possibly include a same tenant. However, this does not affect a final filtering result.

In a specific implementation, for example, M=5, and there is a computing task of a tenant 1, a computing task of a tenant 2, a computing task of a tenant 3, a computing task of a tenant 4, and a computing task of a tenant 5 in the system. Based on the identifier information of the first node and the sharing policy, the computing task of the tenant 1 and the computing task of the tenant 2 are filtered out, and the computing task of the tenant 3, the computing task of the tenant 4, and the computing task of the tenant 5 remain. Based on the identifier information of the first node and the borrowing policy, the computing task of the tenant 2 and the computing task of the tenant 3 are filtered out, and the computing task of the tenant 1, the computing task of the tenant 4, and the computing task of the tenant 5 remain. Finally, an intersection of the two groups of remaining computing tasks is obtained, to obtain the computing task of the tenant 4 and the computing task of the tenant 5.

It should be understood that the main resource-control node may filter out, in different filtering sequences, the computing task that does not meet the sharing policy and the borrowing policy. To be specific, the main resource-control node may first filter out the computing task based on the sharing policy and then filter out the computing task based on the borrowing policy, may first filter out the computing task based on the borrowing policy and then filter out the computing task based on the sharing policy, or may filter out the computing task based on each of the sharing policy and the borrowing policy and finally obtain an intersection of two filtering results. This is not limited in this embodiment of this application.

In an optional embodiment, the first node is a node in a first resource zone RZ, a node included in the first resource zone has a same sharing policy, and the same sharing policy is a sharing policy of the first resource zone.

In an embodiment, in the system architecture 400, nodes in the system may be grouped into a plurality of RZs, and the plurality of RZs include a RRZ and a shared resource zone (SRZ). The first node may be corresponding to a first RZ. The first RZ may be any one of the first RRZ, the second RRZ, and the SRZ in the system architecture 400. In this case, a sharing policy of an RZ is a sharing policy of each node in the RZ, a resource provider is the RZ, and a resource user is a tenant and a computing task of the tenant. For the RRZ, the RRZ is allocated to a specific tenant. From this perspective, the tenant possibly has a dual identity as both a resource provider and a resource borrower.

It should be understood that an RZ should include only nodes having a same sharing policy. The same sharing policy is a sharing policy of the RZ. A tenant that has use permission for an RZ may be determined based on a sharing policy of the RZ. Optionally, the use permission may include use of a storage resource and a computing resource in order to implement integration of a storage system and a computing system. That is, the storage resource and the computing resource are considered as a whole. In addition, from an aspect of deployment, it is acceptable that a sharing policy is set for an RZ, with no need to set a sharing policy for each node. This helps reduce setting complexity.

In an optional embodiment, the sharing policy is any one of the following policies. a strict reservation policy, a share-upon-idleness policy, or a fair sharing policy, where the strict reservation policy is used to indicate that a computing resource of the first node is allowed to be used for only the computing task of the i tenants, the share-upon-idleness policy is used to indicate that a tenant other than the i tenants is allowed to use the computing resource of the first node only when the first node is idle, and the fair sharing policy is used to indicate that the at least one tenant is allowed to fairly use the computing resource of the first node.

In an embodiment, the strict reservation policy, the share-upon-idleness policy, and the fair sharing policy may be sharing policies of nodes, or may be sharing policies of RZs. In other words, the main resource-control node further distinguishes, based on a sharing policy of each RZ, an RZ available to a tenant, especially an RRZ and an SRZ. The strict reservation policy means reserving a resource strictly. In the strict reservation policy, only a tenant to which an RZ belongs is allowed to use a resource in the RZ, and another tenant is not allowed to use the resource even if the resource is idle. In the share-upon-idleness policy, a resource of the RZ is reserved for the tenant to which the RZ belongs, but another tenant is allowed to temporarily borrow the resource when the resource is idle. Optionally, in the share-upon-idleness policy, when needing the resource, the tenant to which the RZ belongs preempts the resource based on a highest priority, and it is ensured that the tenant to which the RZ belongs has a 100% weight on the resource in the RZ. The fair sharing policy means that a plurality of tenants share a resource. In the fair sharing policy, the RZ allows a plurality of tenants to fairly use the resource in the RZ based on weights that are agreed upon. RZs of different properties can be generated based on the foregoing different policies. For example, an RZ that has a fair sharing policy is an SRZ, and an RZ that has a strict reservation policy is an RRZ.

It should be understood that this embodiment of this application is described using only the foregoing three sharing policies as an example, and a system administrator or a tenant may further set another different sharing policy for a node or an RZ. This is not limited in this embodiment of this application.

In an optional embodiment, a third tenant in the at least one tenant is initially configured with at least one third node, and a borrowing policy of the third tenant includes, when a quantity of available nodes in the at least one third node is less than a first threshold, the third tenant is allowed to borrow the computing resource of the first node, and/or when a quantity of nodes borrowed by the third tenant is greater than a second threshold, the third tenant is not allowed to borrow the computing resource of the first node, where the at least one third node does not include the first node.

In an embodiment, a borrowing policy of a tenant may be configured by the tenant and stored in a database. The tenant usually owns a node resource. In other words, the system initially configures a part of node resources to provide a service for the tenant. For example, the tenant A in the system architecture 400 corresponds to the first RRZ, and the tenant A can use a resource in the first RRZ. If resources in the first RRZ are insufficient, the tenant A needs to borrow a resource. In this case, the tenant A may set a borrowing policy of the tenant A. The borrowing policy may be that the tenant A is allowed to borrow a resource when a quantity of resources available to the tenant A is less than a first threshold. In this case, when the first threshold is 0, the borrowing policy of the tenant A is that the tenant A can never borrow a shared resource. When the first threshold is large enough, the borrowing policy of the tenant A is that the tenant A can always borrow a shared resource. In addition, the borrowing policy may be that the tenant A is no longer allowed to borrow a resource when a quantity of resources borrowed by the tenant A is greater than a second threshold, or may be another policy. This is not limited in this embodiment of this application.

For example, a job A submitted by the tenant A is running, an expected policy of the tenant A is that an RRZ is preferential, and using a resource in an SRZ when a resource in the RRZ cannot be allocated for one minute is set. All the first 100 tasks, a task 1 to a task 100, of the job run in the RRZ, and a task 101 waits for scheduling. After one minute, the RRZ has no idle resource for running the task 101, and the task 101 is scheduled to run in the SRZ.

In an optional embodiment, the borrowing policy further includes that the third tenant preferentially uses a fourth node, where the fourth node stores data corresponding to a computing task of the third tenant, and the fourth node belongs to a node resource of the third tenant.

In an embodiment, a computing location of a computing task may be optimized by setting a borrowing policy of a tenant. To be specific, the computing task is preferentially scheduled at a storage node of data corresponding to the computing task. This can improve system performance and data security.

It should be understood that the sequence numbers of the foregoing processes do not indicate an execution sequence. An execution sequence of the processes should be determined based on functions and internal logic of the processes, but should not constitute any limitation on an implementation process of this embodiment of this application.

Figure 6:
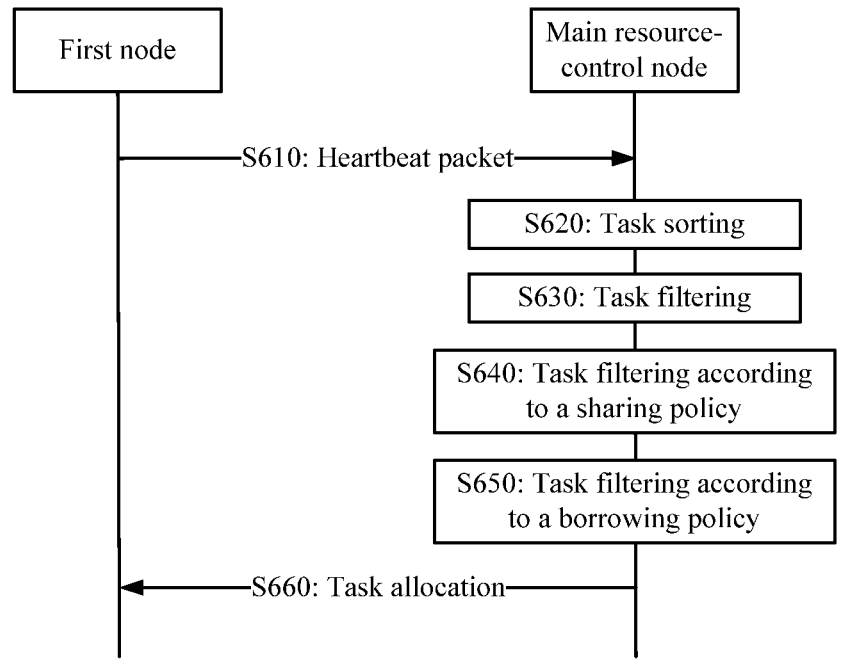
FIG. 6 is a schematic flowchart of another task allocation method according to an embodiment of this application.

FIG. 6 is a schematic flowchart of another task allocation method 600 according to an embodiment of this application. The method 600 may similarly be applied to the system architecture 500. However, this embodiment of this application is not limited thereto.

S610: A first node sends a heartbeat packet to a main resource-control node, to request a computing task.

S620: The main resource-control node receives the heartbeat packet, and sorts all computing tasks in a system based on service priorities.

S630: Filter out, based on a preset restriction condition, a computing task whose execution duration is relatively long.

S640: Filter out, based on a sharing policy of the first node, a computing task, of a tenant, that does not meet the sharing policy.

S650: Filter out, based on a borrowing policy of at least one tenant in the system, a computing task, of a tenant, that does not meet the borrowing policy.

S660: Determine a first computing task from a remaining computing task, and allocate the first computing task to the first node.

In an embodiment, taking a Hadoop resource management (such as Yet Another Resource Negotiator (YARN) system for example, the method 600 reflects a process in which the main resource-control node in the system allocates the task to the computing node. In a Hadoop cluster, task execution has no priority, and a first in first out policy is used for task execution. However, different tasks are corresponding to different services, and therefore, there are higher and lower priorities. In the Hadoop cluster, execution duration of a task is possibly quite long, affecting running of another task, especially running of a task with a higher priority. Therefore, task execution in the system needs to be scheduled. In this embodiment of this application, two filtering steps, S640 and S650, are added. The computing task that meets the foregoing policies is allocated to the first node according to the computing-resource sharing policy of the first node and the computing-resource borrowing policy of the tenant in the system. In this way, a resource sharing mechanism is decoupled from a resource borrowing mechanism. This is simple and easy to implement, and improves user experience.

It should be understood that, in S660, in final determining of the first computing task, the first computing task may be randomly selected from remaining computing tasks. Alternatively, a computing task with a highest priority may be selected as the first computing task based on a priority sequence of remaining computing tasks. This is not limited in this embodiment of this application.

It should be understood that the sequence numbers of the foregoing processes do not indicate an execution sequence. An execution sequence of the processes should be determined based on functions and internal logic of the processes, but should not constitute any limitation on an implementation process of this embodiment of this application.

Figure 7:
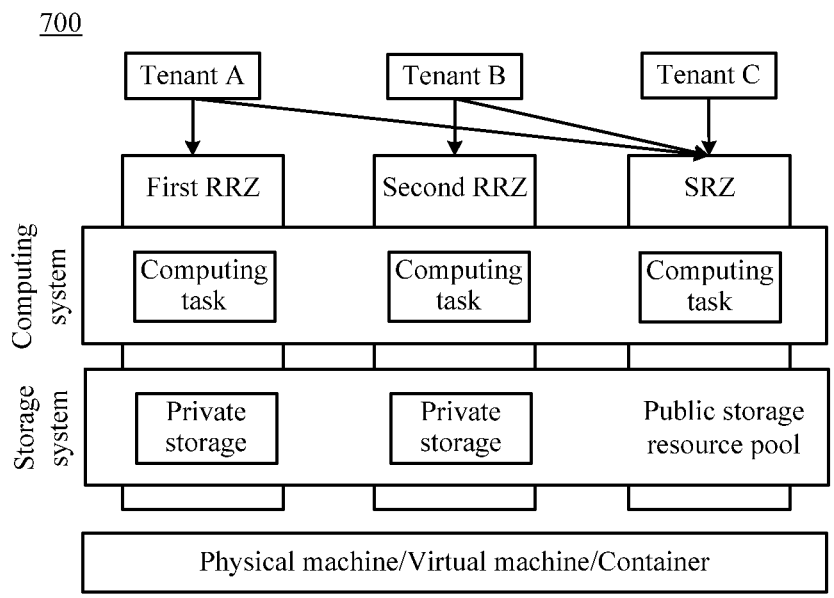
FIG. 7 is a schematic diagram of another system architecture according to an embodiment of this application.

FIG. 7 is a schematic diagram of another system architecture 700 according to an embodiment of this application. The data storage method 300, the task allocation method 500, and the task allocation method 600 may all be applied to the system architecture 700. However, this is not limited in this embodiment of this application.

In an embodiment, the system architecture 700 includes three tenants (a tenant A, a tenant B, and a tenant C), three resource zones (RZ), and nodes corresponding to the three RZs. Each of the three RZs has a respective resource sharing policy, used to indicate which tenants can use a node resource of the RZ. In an embodiment, the three RZs may include a first RZ, a second RZ, and a third RZ. In a preset resource sharing policy, each tenant has different use permission. For example, the first RZ can be used by all the tenants, the second RZ can be used by only the tenant B, and the third RZ can be used by only the tenant C. For another example, the first RZ can be used by the tenant A and the tenant B, the second RZ can be used by the tenant B and the tenant C, and the third RZ can be used by only the tenant B. This is not limited in this embodiment of this application.

Optionally, the three RZs include a first RRZ, a second RRZ, and a shared resource zone (SRZ). The SRZ can be used by all the tenants, the first RRZ can be used by only the tenant A, and the second RRZ can be used by only the tenant B. The foregoing resource zone includes a storage resource and a computing resource. Therefore, the tenants may store data and/or run computing tasks in corresponding RZs.

From a perspective of the computing resource and the storage resource, the RZ may be classified into a computing RZ and a storage RZ. The computing RZ is responsible for computing-resource scheduling, for example, scheduling for a computing service of a tenant and a resident service. The storage RZ is responsible for storage-resource scheduling, that is, placement of tenant data. Therefore, the system architecture 200 reflects a storage RZ, and the system architecture 400 reflects a computing RZ. However, usually, a computing RZ and a storage RZ need to be placed in an overlapping manner, that is, be allocated at a same group of nodes in order to improve system performance and security. The system architecture 700 shows a case in which the computing RZ and the storage RZ are placed in the overlapping manner. In this way, distribution of computing resources and storage resources can be synchronously considered across different systems in order to improve resource deployment flexibility.

It should be understood that the nodes corresponding to the RZs may be physical machines, may be virtual machines, or may be containers. This is not limited in this embodiment of this application.

It should be further understood that FIG. 7 shows only three tenants and three RZs as an example. Optionally, the system architecture 700 may alternatively include a plurality of tenants and a plurality of RZs corresponding to the plurality of tenants. This is not limited in this embodiment of this application. Usually, there is only one SRZ.

The foregoing describes in detail the methods according to the embodiments of this application with reference to FIG. 1 to FIG. 7. The following describes in detail apparatuses according to the embodiments of this application with reference to FIG. 8 to FIG. 11.

Figure 8:
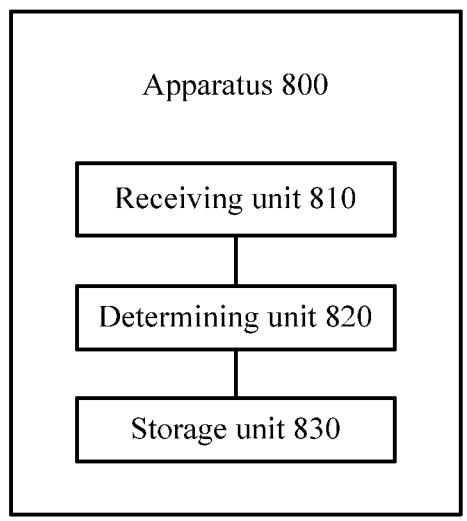
FIG. 8 is a schematic block diagram of a data storage apparatus according to an embodiment of this application.

FIG. 8 is a schematic block diagram of a data storage apparatus 800 according to an embodiment of this application, where the apparatus 800 includes a receiving unit 810, configured to receive a data write request that is sent by a first tenant using a client, where the data write request is used to indicate that the first tenant requests to store N duplicates of to-be-written data, and N is an integer greater than or equal to 1; a determining unit 820, configured to determine, from a plurality of RZs and based on the data write request and storage permission of the first tenant for each of the plurality of resource zones RZs, at least one RZ available to the first tenant, where the determining unit 820 is further configured to determine, based on the data write request and a first data distribution policy, distribution of the N duplicates in the at least one RZ, where the first data distribution policy is used to indicate a distribution priority of the N duplicates in the at least one RZ; and a storage unit 830, configured to store, based on distribution of the N duplicates in the at least one RZ and a second data distribution policy, the N duplicates into at least one node corresponding to the at least one RZ, where the second data distribution policy is used to indicate a distribution priority of the N duplicates at a plurality of nodes corresponding to each of the at least one RZ.

According to the data storage apparatus in this embodiment of this application, nodes available to the tenant are grouped into the at least one resource zone RZ, the first data distribution policy is configured for the at least one RZ, and the second data distribution policy is configured for the nodes corresponding to the at least one RZ. During data storage, a main resource-control node may perform two-phase decision according to the first data distribution policy and the second data distribution policy. Policies in two phases may be independently configured such that the main resource-control node can combine data distribution policies in the different phases, and flexibly control, based on different tenant requirements and a scenario faced by the tenant, distribution of to-be-stored data of the tenant at the node, thereby reducing policy deployment complexity.

Optionally, the at least one RZ includes a first RZ and a second RZ, the first RZ is a reserved resource zone RRZ that only the first tenant is allowed to use, and the second RZ is a shared resource zone (SRZ) that a plurality of tenants including the first tenant are allowed to use.

Optionally, the first data distribution policy is that the N duplicates are preferentially stored into the first RZ, and the determining unit 820 is further configured to determine, based on the data write request, the first data distribution policy, and a space occupation status of the first RZ, that the first RZ is capable of storing P duplicates of the to-be-written data, where P is an integer greater than or equal to 1, and the space occupation status is used to indicate a size of occupied space of the first RZ or a size of remaining space of the first RZ; and when N is less than or equal to P, determine that the N duplicates are distributed in the first RZ; or when N is greater than P, determine that the P duplicates in the N duplicates are distributed in the first RZ, and a duplicate, other than the P duplicates, in the N duplicates is distributed in the second RZ.

Optionally, the first data distribution policy is that Q duplicates in the N duplicates are stored into the second RZ, where Q is an integer greater than or equal to 1, and Q is less than or equal to N, and the determining unit 820 is further configured to determine, based on the data write request and the first data distribution policy, that the Q duplicates in the N duplicates are distributed in the second RZ, and remaining (N-Q) duplicates, other than the Q duplicates, in the N duplicates are distributed in the first RZ.

Optionally, the determining unit 820 is further configured to determine, based on the data write request, the first data distribution policy, and a space occupation status of the first RZ, that the first RZ is capable of storing P duplicates of the to-be-written data, where P is an integer greater than or equal to 1, and the space occupation status is used to indicate a size of occupied space of the first RZ or a size of remaining space of the first RZ; and when N-Q is less than or equal to P, determine that the (N-Q) duplicates are distributed in the first RZ; or when N-Q is greater than P, determine that the P duplicates in the (N-Q) duplicates are distributed in the first RZ, and a duplicate, other than the P duplicates, in the (N-Q) duplicates is distributed in the second RZ.

Optionally, the storage unit 830 is further configured to store, based on the space occupation status of the first RZ, all or some of duplicates in the second RZ into the first RZ, where the space occupation status is used to indicate the size of the occupied space of the first RZ or the size of the remaining space of the first RZ; and the apparatus further includes a deletion unit, configured to delete the all or some of duplicates from the second RZ.

It should be understood that the apparatus 800 is presented in a form of a functional unit. The term "unit" herein may refer to an application-specific integrated circuit (ASIC), an electronic circuit, a processor configured to execute one or more software or firmware programs (for example, a shared processor, a dedicated processor, or a group processor), a memory, a combined logic circuit, and/or another proper component that supports the described functions. In an optional example, a person skilled in the art may understand that the apparatus 800 may further be the main resource-control node in the method 300, and the apparatus 800 may be configured to execute each process and/or step corresponding to the main resource-control node in the method 300. To avoid repetition, details are not described herein again.

Figure 9:
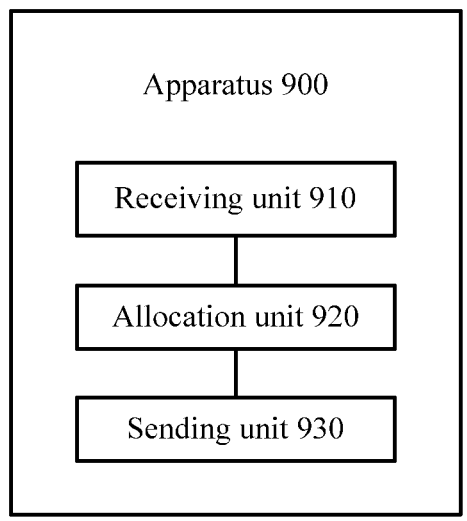
FIG. 9 is a schematic block diagram of a task allocation apparatus according to an embodiment of this application.

FIG. 9 is a schematic block diagram of a task allocation apparatus 900 according to an embodiment of this application, where the apparatus 900 includes a receiving unit 910, configured to receive a computing task allocation request sent by a first node, where the computing task allocation request is used to request to allocate a computing task to the first node; an allocation unit 920, configured to allocate, from a computing task of at least one tenant, a first computing task to the first node based on the computing task allocation request, a sharing policy of the first node, and a borrowing policy of the at least one tenant, where the sharing policy is used to indicate that the first node provides a computing resource for a computing task of i tenants in the at least one tenant, the borrowing policy is used to indicate that a first tenant in the at least one tenant is allowed to use a computing resource of j nodes, and both i and j are integers greater than 0; and a sending unit 930, configured to send task indication information to the first node, where the task indication information is used to indicate the first computing task.

According to the task allocation apparatus in this embodiment of this application, a main resource-control node flexibly performs, based on the computing-resource sharing policy of the computing node in a big data system and the computing-resource borrowing policy of the tenant, matching between the computing node and the computing task that is submitted by the tenant in order to allocate, to the computing node, a computing task that meets the policies. In this way, a resource sharing mechanism is decoupled from a resource borrowing mechanism. This is simple and easy to implement, and improves user experience.

Optionally, the apparatus further includes a matching unit, configured to perform, based on the computing task allocation request, matching between the computing task of the at least one tenant, and the sharing policy and the borrowing policy; a filtering unit, configured to filter out, from the computing task of the at least one tenant, a computing task of m tenants that does not meet the sharing policy and the borrowing policy, where m is an integer greater than or equal to 1; and a determining unit, configured to determine the first computing task from a remaining computing task other than the computing task of the m tenants.

Optionally, the computing task allocation request includes identifier information of the first node, and the filtering unit is further configured to filter out a computing task of p first tenants based on the identifier information of the first node and the sharing policy, where the p first tenants do not belong to the i tenants, and p is an integer greater than or equal to 0; and filter out, from a computing task of a remaining tenant other than the computing task of the p first tenants, a computing task of (m-p) second tenants based on the identifier information of the first node and the borrowing policy, where the first node does not belong to the j nodes.

Optionally, the first node is a node in a first resource zone RZ, a node included in the first resource zone has a same sharing policy, and the same sharing policy is a sharing policy of the first resource zone.

Optionally, the sharing policy is any one of the following policies, such as a strict reservation policy, a share-upon-idleness policy, or a fair sharing policy, where the strict reservation policy is used to indicate that a computing resource of the first node is allowed to be used for only the computing task of the i tenants, the share-upon-idleness policy is used to indicate that a tenant other than the i tenants is allowed to use the computing resource of the first node only when the first node is idle, and the fair sharing policy is used to indicate that the at least one tenant is allowed to fairly use the computing resource of the first node.

Optionally, a third tenant in the at least one tenant is initially configured with at least one third node, and a borrowing policy of the third tenant includes, when a quantity of available nodes in the at least one third node is less than a first threshold, the third tenant is allowed to borrow the computing resource of the first node; and/or when a quantity of nodes borrowed by the third tenant is greater than a second threshold, the third tenant is not allowed to borrow the computing resource of the first node, where the at least one third node does not include the first node.

Optionally, the borrowing policy further includes that the third tenant preferentially uses a fourth node, where the fourth node stores data corresponding to a computing task of the third tenant, and the fourth node belongs to a node resource of the third tenant.

It should be understood that the apparatus 900 is presented in a form of a functional unit. The term "unit" herein may refer to an ASIC, an electronic circuit, a processor configured to execute one or more software or firmware programs (for example, a shared processor, a dedicated processor, or a group processor), a memory, a combined logic circuit, and/or another proper component that supports the described functions. In an optional example, a person skilled in the art may understand that the apparatus 900 may further be the main resource-control node in the embodiment 500 or 600, and the apparatus 900 may be configured to execute each process and/or step corresponding to the main resource-control node in the method embodiment 500 or 600. To avoid repetition, details are not described herein again.

Figure 10:
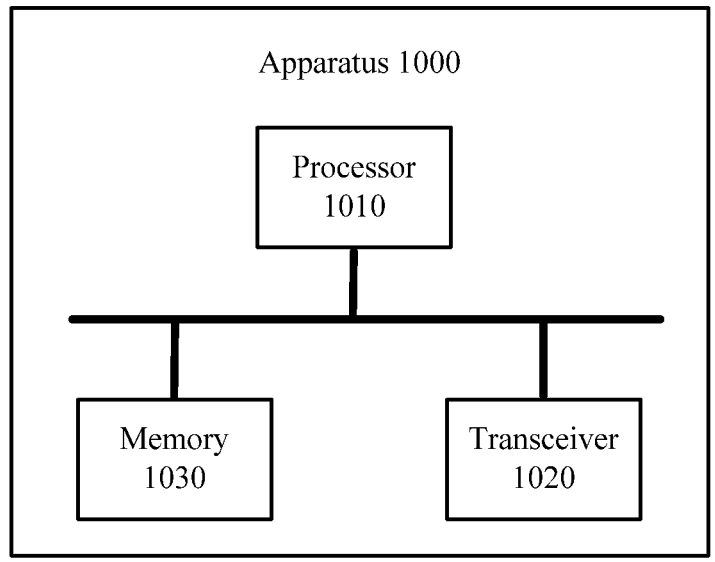
FIG. 10 is a schematic block diagram of another data storage apparatus according to an embodiment of this application.

FIG. 10 is a schematic block diagram of another data storage apparatus 1000 according to an embodiment of this application. The apparatus 1000 includes a processor 1010, a transceiver 1020, and a memory 1030. The processor 1010, the transceiver 1020, and the memory 1030 communicate with each other using an internal connection path. The memory 1030 is configured to store an instruction. The processor 1010 is configured to execute the instruction stored in the memory 1030, to control the transceiver 1020 to send a signal and/or receive a signal.

The transceiver 1020 is configured to receive a data write request that is sent by a first tenant using a client, where the data write request is used to indicate that the first tenant requests to store N duplicates of to-be-written data, and N is an integer greater than or equal to 1. The processor 1010 is configured to determine, from a plurality of RZs and based on the data write request and storage permission of the first tenant for each of the plurality of resource zones RZs, at least one RZ available to the first tenant; determine, based on the data write request and a first data distribution policy, distribution of the N duplicates in the at least one RZ, where the first data distribution policy is used to indicate a distribution priority of the N duplicates in the at least one RZ; and store, based on distribution of the N duplicates in the at least one RZ and a second data distribution policy, the N duplicates into at least one node corresponding to the at least one RZ, where the second data distribution policy is used to indicate a distribution priority of the N duplicates at a plurality of nodes corresponding to each of the at least one RZ.

It should be understood that the apparatus 1000 may further be the main resource-control node in the embodiment 300, and may be configured to execute each step and/or process corresponding to the main resource-control node in the method embodiment 300. Optionally, the memory 1030 may include a read-only memory and a random access memory, and provides an instruction and data for the processor. A part of the memory may further include a nonvolatile random access memory. For example, the memory may further store device type information. The processor 1010 may be configured to execute the instruction stored in the memory. In addition, when the processor 1010 executes the instruction stored in the memory, the processor 1010 is configured to execute each step and/or process corresponding to the main resource-control node in the embodiment 300.

Figure 11:
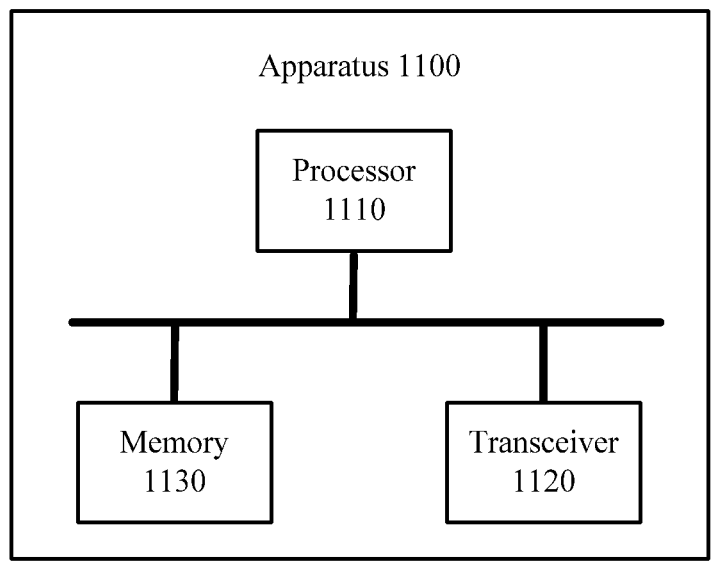
FIG. 11 is a schematic block diagram of another task allocation apparatus according to an embodiment of this application.

FIG. 11 is a schematic block diagram of another task allocation apparatus 1100 according to an embodiment of this application. The apparatus 1100 includes a processor 1110, a transceiver 1120, and a memory 1130. The processor 1110, the transceiver 1120, and the memory 1130 communicate with each other using an internal connection path. The memory 1130 is configured to store an instruction. The processor 1110 is configured to execute the instruction stored in the memory 1130, to control the transceiver 1120 to send a signal and/or receive a signal.

The transceiver 1120 is configured to receive a computing task allocation request sent by a first node, where the computing task allocation request is used to request to allocate a computing task to the first node. The processor 1110 is configured to allocate, from a computing task of at least one tenant, a first computing task to the first node based on the computing task allocation request, a sharing policy of the first node, and a borrowing policy of the at least one tenant, where the sharing policy is used to indicate that the first node provides a computing resource for a computing task of i tenants in the at least one tenant, the borrowing policy is used to indicate that a first tenant in the at least one tenant is allowed to use a computing resource of j nodes, and both i and j are integers greater than 0. The transceiver 1120 is configured to send task indication information to the first node, where the task indication information is used to indicate the first computing task.

It should be understood that the apparatus 1100 may further be the main resource-control node in the embodiment 500 or 600, and may be configured to execute each step and/or process corresponding to the main resource-control node in the method embodiment 500 or 600. Optionally, the memory 1130 may include a read-only memory and a random access memory, and provides an instruction and data for the processor. A part of the memory may further include a nonvolatile random access memory. For example, the memory may further store device type information. The processor 1110 may be configured to execute the instruction stored in the memory. In addition, when the processor 1110 executes the instruction stored in the memory, the processor 1110 is configured to execute each step and/or process corresponding to the main resource-control node in the embodiment 500 or 600.

In the embodiments of this application, the main resource-control node may be any apparatus that has the foregoing data storage function and/or task allocation function. In other words, the main resource-control node may be merely configured to execute the data storage method, may be merely configured to execute the task allocation method, or may be not only configured to execute the data storage method but also configured to execute the task allocation method. This is not limited in the embodiments of this application.

It should be understood that, in the embodiments of this application, the processor of the apparatus may be a central processing unit (CPU). The processor may alternatively be another general purpose processor, a digital signal processor (DSP), an ASIC, a field-programmable gate array (FPGA) or another programmable logic device, a discrete gate or a transistor logic device, or a discrete hardware component. The general purpose processor may be a microprocessor, or the processor may be any conventional processor or the like.

In an implementation process, the steps of the foregoing method may be completed using an integrated logic circuit of hardware in the processor or using an instruction in a form of software. The steps of the method disclosed with reference to the embodiments of this application may be directly executed by a hardware processor, or may be executed by a combination of hardware in a processor and a software unit. The software unit may be located in a storage medium that is mature in the art, such as a random access memory, a flash memory, a read-only memory, a programmable read-only memory, an electrically erasable programmable memory, or a register. The storage medium is located in a memory. The processor executes an instruction in the memory, and completes the steps of the foregoing method in combination with the hardware of the processor. To avoid repetition, details are not described herein again.

It should be understood that "one embodiment" or "an embodiment" mentioned in the whole specification indicates that specific features, structures, or characteristics related to the embodiment are included in at least one embodiment of this application. Therefore, "in one embodiment" or "in an embodiment" appearing throughout the specification may not indicate a same embodiment. In addition, these specific features, structures, or characteristics may be combined in one or more embodiments in any proper manner. It should be understood that, in the embodiments of this application, sequence numbers of the foregoing processes do not indicate an execution sequence. An execution sequence of the processes should be determined based on functions and internal logic of the processes, but should not constitute any limitation on implementation processes of the embodiments of this application.

In addition, the terms "system" and "network" in this specification are usually used interchangeably in this specification. The term "and/or" in this specification is merely an associative relationship for describing associated objects, and indicates that three relationships may exist. For example, A and/or B may indicate the following three cases. A alone exists, both A and B exist, and B alone exists. In addition, the character "/" in this specification usually indicates that there is an "or" relationship between former and latter associated objects.

It should be understood that, in the embodiments of this application, "B corresponding to A" indicates that B is associated with A, and B may be determined based on A. However, it should further be understood that determining B based on A does not mean that B is determined based on only A, that is, B may also be determined based on A and/or other information.

A person of ordinary skill in the art may be aware that units and algorithm steps in the examples described with reference to the embodiments disclosed in this specification may be implemented by electronic hardware, computer software, or a combination thereof. To clearly describe interchangeability between the hardware and the software, the foregoing generally describes compositions and steps of each example based on functions. Whether the functions are performed by hardware or software depends on specific applications and design constraint conditions of the technical solutions. A person skilled in the art may use different methods to implement the described functions for each specific application, but it should not be considered that such an implementation goes beyond the scope of this application.

It can be clearly understood by a person skilled in the art that, for ease and brevity of description, for specific working processes of the foregoing systems, apparatuses, and units, reference may be made to corresponding processes in the foregoing method embodiments, and details are not described herein again.

In the several embodiments provided in this application, it should be understood that the disclosed systems, apparatuses, and methods may be implemented in other manners. For example, the described apparatus embodiment is merely an example. For example, the unit division is merely logical function division and may be other division in actual implementation. For example, a plurality of units or components may be combined or may be integrated into another system, or some features may be ignored or not performed. In addition, the displayed or discussed mutual couplings, direct couplings, or communication connections may be implemented through some interfaces or indirect couplings or communication connections between apparatuses or units, or may be implemented through electrical connections, mechanical connections, or connections in other forms.

The units described as separate parts may or may not be physically separate, and parts displayed as units may or may not be physical units, may be located in one position, or may be distributed on a plurality of network units. Some or all of the units may be selected depending on an actual requirement, to achieve the objectives of the solutions in the embodiments of this application.

In addition, functional units in the embodiments of this application may be integrated into one processing unit, or each of the units may exist alone physically, or two or more units may be integrated into one unit. The integrated unit may be implemented in a form of hardware, or may be implemented in a form of a software function unit.

When the integrated unit is implemented in the form of a software function unit and is sold or used as an independent product, the integrated unit may be stored in a computer readable storage medium. Based on such an understanding, the technical solutions of this application essentially, or the part contributing to other approaches, or all or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of this application. The foregoing storage medium includes various media that can store program code, such as a Universal Serial Bus (USB) flash drive, a removable hard disk, a read-only memory (ROM), a random access memory (RAM), a magnetic disk, or an optical disc.

The foregoing descriptions are merely specific implementations of this application. The protection scope of this application is not limited thereto. Any equivalent modification or replacement readily figured out by a person skilled in the art within the technical scope disclosed in this application shall fall within the protection scope of this application.

Therefore, the protection scope of this application shall be subject to the protection scope of the claims.

What is claimed is:

1. A data storage method, comprising:
receiving, from a first tenant, a data write request via a client, wherein the data write request indicates that the first tenant is requesting storing N duplicates of data, and wherein N is an integer greater than or equal to one;
obtaining at least one resource zone (RZ) based on a first data distribution policy and a storage permission of the first tenant, wherein the first data distribution policy indicates a first distribution priority of the N duplicates of data in the at least one RZ;
obtaining at least one node based on a second data distribution policy, wherein the at least one node corresponds to the at least one RZ, and wherein the second data distribution policy indicates a second distribution priority of the N duplicates at a plurality of nodes that correspond to each of the RZs; and
allocating the N duplicates of data into the at least one node that corresponds to the at least one RZ.

2. The data storage method of claim 1, wherein the at least one RZ comprises a first RZ and a second RZ, wherein the first RZ is a reserved resource zone (RRZ) that only the first tenant is allowed to use, and wherein the second RZ is a shared resource zone (SRZ) that a plurality of tenants, including the first tenant, is allowed to use.

3. A data storage apparatus, comprising
a transceiver configured to receive a data write request from a first tenant via a client, wherein the data write request indicates that the first tenant is requesting storing N duplicates of data, and wherein N is an integer greater than or equal to one;
a processor coupled to the transceiver and configured to:
obtain at least one resource zone (RZ) based on a first data distribution policy and a storage permission of the first tenant, wherein the first data distribution policy indicates a first distribution priority of the N duplicates of data in the at least one RZ;
obtain at least one node based on a second data distribution policy, wherein the at least one node corresponds to the at least one RZ, and wherein the second data distribution policy indicates a second distribution priority of the N duplicates at a plurality of nodes that correspond to each of the RZs; and
allocate, the N duplicates of data into at least one node that corresponds to at least one RZ.

4. The data storage apparatus of claim 3, wherein the at least one RZ comprises a first RZ and a second RZ, wherein the first RZ is a reserved resource zone (RRZ) that only the first tenant is allowed to use, and wherein the second RZ is a shared resource zone (SRZ) that a plurality of tenants including the first tenant is allowed to use.

5. A computer program product comprising computer-executable instructions stored on a non-transitory computer-readable medium that, when executed by a processor, cause a data storage apparatus to:
receive, from a first tenant, a data write request via a client, wherein the data write request indicates that the first tenant is requesting storing N duplicates of data, wherein N is an integer greater than or equal to one;
obtain at least one resource zone (RZ) based on a first data distribution policy and a storage permission of the first tenant, wherein the first data distribution policy indicates a first distribution priority of the N duplicates of data in the at least one RZ;
obtain at least one node based on a second data distribution policy, wherein the at least one node corresponds to the at least one RZ, and wherein the second data distribution policy indicates a second distribution priority of the N duplicates at a plurality of nodes that correspond to each of the RZs; and
allocate the N duplicates of data into the at least one node that corresponds to at least one RZ.

6. The computer program product of claim 5, wherein the at least one RZ comprises a first RZ and a second RZ, wherein the first RZ is a reserved resource zone (RRZ) that only the first tenant is allowed to use, and wherein the second RZ is a shared resource zone (SRZ) that a plurality of tenants comprising the first tenant is allowed to use.

7. The data storage method of claim 2, wherein the storage permission of the first tenant indicates a size of occupied space of the first RZ or a size of remaining space of the first RZ.

8. The data storage method of claim 2, wherein the first data distribution policy is that Q duplicates of data in the N duplicates of data are to be stored in the second RZ, wherein Q is an integer greater than or equal to one and less than or equal to N, wherein the allocating comprises identifying that the Q duplicates of data are distributed in the second RZ and (N-Q) duplicates of data other than the Q duplicates are distributed in the first RZ.

9. The data storage method of claim 2, wherein the first data distribution policy is that the N duplicates of data are to be preferentially stored in the first RZ, wherein the first RZ is capable of storing P duplicates of data in the N duplicates of data, and wherein P is an integer greater than or equal to one.

10. The data storage method of claim 9, further comprising identifying that the N duplicates of data are distributed in the first RZ when N is less than or equal to P.

11. The data storage method of claim 9, further comprising identifying that the P duplicates of data are distributed in the first RZ and a duplicate of data, other than the P duplicates of data, in the N duplicates of data is distributed in the second RZ when N is greater than P.

12. The data storage apparatus of claim 4, wherein the storage permission of the first tenant indicates a size of occupied space of the first RZ or a size of remaining space of the first RZ.

13. The data storage apparatus of claim 4, wherein the first data distribution policy is that Q duplicates of data in the N duplicates of data are to be stored into the second RZ, wherein Q is an integer greater than or equal to one and less than or equal to N, wherein the instructions further cause the data storage apparatus to be configured to identify that the Q duplicates of data are distributed in the second RZ and (N-Q) duplicates of data other than the Q duplicates of data are distributed in the first RZ.

14. The data storage apparatus of claim 4, wherein the first data distribution policy is that the N duplicates of data are to be preferentially stored into the first RZ, wherein the first RZ is capable of storing P duplicates of data in the N duplicates of data, and wherein P is an integer greater than or equal to one.

15. The data storage apparatus of claim 14, wherein the instructions further cause the data storage apparatus to be configured to identify that the N duplicates of data are distributed in the first RZ when N is less than or equal to P.

16. The data storage apparatus of claim 14, wherein the instructions further cause the data storage apparatus to be configured to identify that the P duplicates of data are distributed in the first RZ and a duplicate of data, other than the P duplicates of data, in the N duplicates of data is distributed in the second RZ when N is greater than P.

17. The computer program product of claim 6, wherein the storage permission of the first tenant indicates a size of occupied space of the first RZ or a size of remaining space of the first RZ.

18. The computer program product of claim 6, wherein the first data distribution policy is that Q duplicates of data in the N duplicates of data are to be stored into the second RZ, wherein Q is an integer greater than or equal to one and less than or equal to N, and wherein the computer-executable instructions further cause the data storage apparatus to identify that the Q duplicates of data are distributed in the second RZ and (N-Q) duplicates of data other than the Q duplicates of data are distributed in the first RZ.

19. The computer program product of claim 6, wherein the first data distribution policy is that the N duplicates of data are to be preferentially stored into the first RZ, wherein the first RZ is capable of storing P duplicates of data in the N duplicates of data, wherein P is an integer greater than or equal to one, and wherein the computer-executable instructions further cause the data storage apparatus to identify that the N duplicates of data are distributed in the first RZ when N is less than or equal to P.

20. The computer program product of claim 19, wherein the computer-executable instructions further cause the data storage apparatus to identify that the P duplicates of data are distributed in the first RZ and a duplicate of data, other than the P duplicates of data, in the N duplicates of data is distributed in the second RZ when N is greater than P.

* * * * *